US009140556B1

(12) United States Patent
Sheikh et al.

(10) Patent No.: US 9,140,556 B1
(45) Date of Patent: Sep. 22, 2015

(54) METHOD AND SYSTEM FOR GAMMA-RAY LOCALIZATION INDUCED SPACECRAFT NAVIGATION USING CELESTIAL GAMMA-RAY SOURCES

(71) Applicant: ASTER LABS, INC., Shoreview, MN (US)

(72) Inventors: Suneel I. Sheikh, Shoreview, MN (US); Chuck Hisamoto, Woodbury, MN (US); Zaven Arzoumanian, Greenbelt, MD (US)

(73) Assignee: Aster Labs, Inc., Shoreview, MN (US)

( * ) Notice: Subject to any disclaimer, the term of this patent is extended or adjusted under 35 U.S.C. 154(b) by 0 days.

(21) Appl. No.: 14/178,458

(22) Filed: Feb. 12, 2014

Related U.S. Application Data

(60) Provisional application No. 61/764,472, filed on Feb. 13, 2013, provisional application No. 61/783,321, filed on Mar. 14, 2013.

(51) Int. Cl.
*G01C 21/02* (2006.01)

(52) U.S. Cl.
CPC .................... *G01C 21/025* (2013.01)

(58) Field of Classification Search
CPC ...... G01C 21/02; G01C 21/025; G01S 11/12; G01S 11/125; B64G 1/24; B64G 1/245; B64G 1/35; B64G 1/351
USPC ................................. 701/513, 531
See application file for complete search history.

(56) References Cited

U.S. PATENT DOCUMENTS

2009/0018762 A1* 1/2009 Sheikh ..................... 701/200
2011/0155858 A1* 6/2011 Lagadec et al. ........... 244/171

OTHER PUBLICATIONS

Meijlink et al., "First Measurement of Scintillation Photon Arrival Statistics Using a High-Granularity Solid-State Photosensor Enabling Time-Stamping of up to 20,480 Single Photons", Nuclear Science Symposium and Medical Imaging COnference (NSS/MIC), 2011 IEEE.*
Taylor, J. H., "Pulsar Timing and Relativistic Gravity," Philosophical Transactions: Physical Sciences and Engineering, vol. 341, Issue 1660, pp. 117-134.
Van Straten, W., et al., "Pulsar data analysis with PSRCHIVE," Astronomical Research and Technology, vol. 9, No. 3, 2012, pp. 237-256.
Aptekar, R.L., et al., "Konus-Wind Observations of the New Soft Gamma-Ray Repeater SGR 0401+4516," The Astrophysical Journal, vol. 698, No. 2, 2009, pp. 82-85.

(Continued)

*Primary Examiner* — Fadey Jabr
*Assistant Examiner* — Aaron L Troost
(74) *Attorney, Agent, or Firm* — Rosenberg, Klein & Lee

(57) ABSTRACT

A method and system for spacecraft navigation using distant celestial gamma-ray bursts which offer detectable, bright, high-energy events that provide well-defined characteristics conducive to accurate time-alignment among spatially separated spacecraft. Utilizing assemblages of photons from distant gamma-ray bursts, relative range between two spacecraft can be accurately computed along the direction to each burst's source based upon the difference in arrival time of the burst emission at each spacecraft's location. Correlation methods used to time-align the high-energy burst profiles are provided. The spacecraft navigation may be carried out autonomously or in a central control mode of operation.

20 Claims, 21 Drawing Sheets

(56) References Cited

OTHER PUBLICATIONS

Tjoelker, R. L., et al., "Mercury Atomic Frequency Standards for Space Based Navigation and Timekeeping," Proceedings of the 43rd PTTI, 2011).

Sheikh, S. I., et al., "Recursive Estimation of Spacecraft Position and Velocity Using X-ray Pulsar Time of Arrival Measurements," Navigation: Journal of the Institute of Navigation, vol. 53, No. 3, 2006, pp. 149-166.

* cited by examiner

METHOD AND SYSTEM FOR GAMMA-RAY LOCALIZATION INDUCED SPACECRAFT NAVIGATION USING CELESTIAL GAMMA-RAY SOURCES

STATEMENT REGARDING FEDERALLY SPONSORED RESEARCH OR DEVELOPMENT

The development of the invention described herein was funded by NASA under Grant No. NNX12CE15P. The U.S. government has certain rights in this invention.

REFERENCE TO THE RELATED APPLICATION

This Utility Patent Application is based on Provisional Patent Application Ser. No. 61/764,472 filed on 13 Feb. 2013 and Ser. No. 61/783,321 filed on 14 Mar. 2013.

FIELD OF THE INVENTION

The present invention relates to a system and method for navigation of vehicles utilizing celestial sources of radiation.

In particular, the present invention directs itself to continual estimation of three-dimensional spacecraft position and velocity using celestial gamma-ray sources; and specifically, to an autonomous or centralized navigation of a spacecraft using celestial gamma-ray sources.

The present invention is also directed to a method and system using a gamma-ray detector mounted on a spacecraft, satellite, planetary rover, or other vehicle of interest, to detect gamma-ray bursts emitted from celestial gamma-ray sources, and processing the received/detected signal to compute navigation data for the vehicle of interest.

In overall concept, the present invention is directed to a system, mounted either on a deep space vehicle of interest or at a central control station, for processing of detected assemblages of time-tagged photons arriving from celestial gamma-ray bursts to compute (either autonomously at the deep space vehicle of interest or at the central control station) a relative range of the deep space vehicle location with respect to a reference vehicle along the line-of-sight to the gamma-ray burst source based on the difference in arrival time of the burst emission at the vehicle of interest and the reference vehicle.

In addition, the present invention is directed to a method and system using detection of high-energy events from celestial gamma-ray sources that provide well-defined characteristics conducive to accurate time-alignment between a spatially separated deep space vehicle and a reference vehicle, and applying correlation techniques to the high-energy burst profiles detected at the deep space vehicle and the reference vehicle to compute time offset between the arrival of the high-energy burst profiles at the deep space and reference vehicles to subsequently compute navigation data for the deep space vehicle.

Additionally, the present invention directs itself to a navigation system and method developed for computation of a relative position of a spacecraft of interest with regard to a reference location, such as a reference spacecraft location, by processing high-energy events from celestial gamma-ray sources detected at the spacecraft of interest and the reference spacecraft, and configured for calculation of error correction data for continuous updating of the computed data for highly accurate navigation.

BACKGROUND OF THE INVENTION

For space vehicles venturing beyond Earth orbit into deep space, current methods require frequent interaction and communication with Earth stations, which can significantly increase mission scheduling and operational costs.

The NASA Deep Space Network (DSN) is the primary provider of navigation and communication for the U.S. and its partnering nations on deep-space missions. DSN's capability has achieved mission success throughout its over fifty years of operation. However, as exploration initiatives increase and operational usage expands, the DSN has the potential for over-subscription due to its many ongoing and future planned missions, and thus stands to benefit from supplemental navigation augmentation capabilities designed to reduce DSN operations cost.

In addition to improved operational support, expanded exploration of the Solar System beyond current day capabilities requires innovative, non-conventional techniques for vehicle navigation. Very few existing systems can provide this additional service while reducing DSN workload. Therefore, new methods are required that support the DSN system by alleviating any operational interruptions and providing for increased operational autonomy of deep space vehicles.

A previous study of a navigation system based on variable celestial X-ray sources (in the range 0.1-20 keV), referred to as the X-ray Navigation and Autonomous Position Verification program, or XNAV, has shown the capability to support DSN measurements for deep space missions. XNAV relies on pulsars located at known positions on the sky and a pulse-timing model of the expected arrival time of each pulse. The periodic nature of these pulsar sources provides a reliable signal that can be continually detected and tracked. An XNAV range measurement is calculated using an observed pulse profile on a spacecraft and the predicted pulse arrival time from each pulsar's model. The observation time required to produce each XNAV measurement depends on each pulsar's unique characteristics and the spacecraft's detector qualities. A shortcoming of the XNAV technique is that many X-ray pulsars are faint and require extended observation times to generate sufficient usable data.

It would be desirable to provide a system capable of addressing the challenges of future DSN operations and enhancing position accuracy for deep space vehicles, as well as extending the XNAV navigation concepts to celestial sources emitting much higher energy photons than the celestial X-ray sources.

Gamma-ray bursts (also referred to herein as GRBs) are the most powerful explosions known in the Universe. They are extremely luminous, with many orders of magnitude more energy output in a few seconds than the Sun emits in a year. GRBs are theorized to be produced during the evolutionary end-stages of single and binary star systems. This includes the unusually energetic supernova explosions (so-called hypernovae), the merger of two neutrons stars, or when a small star is consumed by a black hole.

GRBs have been detected approximately once per day by past and existing science missions, although they are theorized to occur at a much higher rate due to the concept of beaming, in which the emissions from a burst are focused into only $1/100^{th}$ of the total sky.

Thousands of GRBs have been detected since they were initially discovered in 1967 by the Vela satellites. GRB events are typically named and catalogued according to their detection date, in the format GRBYYYYMMDDx, where x is an optional letter designation for cases in which multiple bursts occur on a given day. These sources are typically detectable via their emissions in the tens of keV to MeV, and often higher, photon energy bands.

GRBs are typically classified morphologically into a few distinct classes, based on temporal and flux characteristics.

Using the Term $T_{90}$ as the time over which the burst emits from 5% to 95% of its total photon counts, long bursts are those with $T_{90}>2$ sec, and are thought to be related to massive star collapse. Short bursts exhibit duration of $T_{90}<2$ sec.

Another classification approach is fluence, S, which is the photon flux integrated over time. High fluence bursts exhibit $S>1.6\times10^{-4}$ erg/cm$^2$/$T_{90}$, whereas low fluence bursts are those with $S<1.6\times10^{-4}$ erg/cm$^2$/$T_{90}$. Most bursts exhibit some degree of a fast-rise and exponential-decay, referred to as FRED, behavior.

Short bursts are known to have harder spectra than long bursts, where a greater proportion of the detected photons are of higher energy. The importance of spectral properties, coupled with the sensitive energy band, E, of a given detector, can be seen in the relative statistics of GRB detection between instruments and missions.

As an example, the mission Fermi spacecraft's Gamma-ray Burst Monitor (GBM), with an effective area a factor of ~3 smaller than that of Swift's Burst Alert Telescope (BAT), detects 1.5 times more GRBs per year. The reason for this dramatic difference is, in part, GBM's greater sky coverage, but also that GBM's sensitivity extends over a much broader energy band (8 keV$\leq$E$\leq$30 MeV) than does BAT (15 keV$\leq$E$\leq$150 keV).

Because the GBM's higher-energy response is a better match to the hard-spectrum emission from short bursts, a significantly larger fraction of bursts detected by GBM are short, compared to BAT.

The gamma-ray emissions of nearby neutron stars are visible as their radiation beams are swept across the Earth's line of sight by the stars' rotations. Both young neutron stars—with spin periods of tens of milliseconds and magnetic field strengths of order $10^{12}$ G—and those that have been recycled in a past mass-accretion evolutionary episode (leaving them with spin periods less than 10 ms and $10^9$ G magnetic fields) are visible as sources of pulsed gamma-rays. The latter exhibit highly predictable timing behavior, enabling applications that rely on the regularity of their pulsations.

Catalogues of rotation-powered pulsars from which pulsed $\gamma$-rays have been detected from the Fermi and INTEGRAL missions detail basic properties and $\gamma$-rays fluxes that drive exposure times required for useful navigation precision. The catalogue includes both rotation-powered pulsars and soft-gamma repeaters (SGRs), which are bright, flaring, recurring sources.

The Fermi team has reported, in its published Second Source Catalog, 83 rotation-powered pulsars from which pulsed $\gamma$-rays have been detected. Among the pulsed sources, fluxes are typically at the level of $10^{-8}$ photons/cm$^2$/sec. The brightest, the Vela pulsar, has a flux of $3.4\times10^{-6}$ photons/cm$^2$/sec. These fluxes are integrated over the energy band 0.3 MeV to 1 GeV, where the (hard) $\gamma$-ray emissions of rotation-powered pulsars are brightest—below a hundred MeV. Galactic background emission reduces signal-to-noise ratios considerably. Above a few GeV, pulsar spectra cut off exponentially.

The Fermi Large Area Telescope (LAT) effective collecting area in the 0.3-1 GeV band is approximately 6,000 cm$^2$, so that for the Vela pulsar, the detected photon flux is 0.02 counts/sec. While this flux level is potentially conducive to navigation analysis in the manner of XNAV, scaling the large sized LAT down to a detector size that would be appropriate to a navigation subsystem would significantly reduce the photon detection rate. Additionally, for a more-typical fainter $\gamma$-ray pulsar, the photon flux is two orders of magnitude lower.

In the energy band at the low end of GRB emissions (tens to 100 keV), the INTEGRAL satellite provides a good measure of typical fluxes for both rotation-powered pulsars and so-called magnetars (SGRs and anomalous X-ray pulsars that are believed to be powered by the slow decay of their enormously strong magnetic field). In its survey mode, INTEGRAL detected three pulsars, two AXPs (Anomalous X-ray pulsars), and two SGRs (Soft Gamma Repeaters). These pulsars are among the brightest in their classes (pointed, non-survey INTEGRAL observations are much more sensitive to dimmer sources). Typical fluxes in both the soft (20-40 keV) and hard (40-100 keV) INTEGRAL bands for these seven objects are in the vicinity of $3\times10^{-4}$ ph/cm$^2$/sec. With INTEGRAL's effective area of 2,600 cm$^2$, a detected photon flux of ~1 count/sec is produced.

These detected INTEGRAL fluxes are for sources in their quiescent state. Rotation-powered pulsars are not variable in flux, but both magnetar varieties exhibit sporadic, unpredictable flares; those from SGRs can be exceedingly bright. These SGR flares are believed to recur every few years. AXP flares, on the other hand, increase the quiescent flux by a factor of a 2-5, and recur every few days-to-weeks, with larger flares being less frequent.

These low photon flux rates make the use of $\gamma$-ray pulsars an extreme challenge for a practical navigation system. Thus, the more useful $\gamma$-ray sources are those of the high flux GRB type.

It is therefore desirable to provide a new technique for determining spacecraft navigation solutions using high-energy events photons from distant celestial gamma-ray burst (GRB) sources.

SUMMARY OF THE INVENTION

It is therefore an object of the present invention to provide a new technique for determining a position and velocity of a deep-space vehicle using high-energy $\gamma$-ray photons produced by distant celestial gamma-ray bursts.

It is a further object of the present invention to provide a method and a system for autonomous navigation of a deep space spacecraft using celestial gamma-ray sources.

It is also an object of the present invention to provide a method and a system capable of an autonomous as well as centralized computation of the spacecraft navigation solutions using celestial gamma-ray bursts.

It is another object of the present invention to provide a new technique for an accurate computation of a relative range between two spacecraft locations based on processing of assemblages of gamma-ray photons arriving from distant gamma-ray bursts (GRBs), along the direction to the GRB based upon the difference in arrival time of the burst emission at each spacecraft's location.

In addition, it is an object of the present invention to provide a navigation system using correlation techniques for time-alignment of the high-energy burst profiles detected by the detectors mounted at the vehicle of interest and the base station, to compute navigation solutions based on the time difference of arrival of the gamma-ray photons at the respective detecting systems, and augmented with an error correction sub-system that continuously updates the computed navigation data for highly accurate navigation of the vehicle of interest.

To address the challenges of future DSN operations and enhance position accuracy for deep space vehicles, a novel relative navigation technology for deep-space exploration using measurements of celestial gamma-ray sources has been developed that incorporates existing designs of autonomous navigation technologies and merges this with the developing science of high energy sensor components. This new technology for interplanetary self-navigation referred to herein as Gamma-Ray Source Localization-Induced Navigation and Timing, also referred to as GLINT, provides important enhancements to planned exploration and discovery missions, specifically by increasing the on-board navigation and guidance capability, thereby reducing operational requirements.

The subject GLINT technology will extend the XNAV navigation concepts to celestial sources emitting much higher energy photons (20 keV-1 MeV). The GLINT method and system uses gamma-ray photons from distant celestial gamma-ray bursts (GRB) to provide measurements supporting the continual estimation of three-dimensional spacecraft position and velocity. Whereas the XNAV concept can compute an absolute position of a spacecraft with respect to an inertial origin, the overall GLINT concept measures the relative range of an observing vehicle with respect to a reference observer along the line-of-sight of the celestial source.

This relative position is computed using multiple relative range measurements based upon the difference in the arrival time of the burst at each spacecraft's location, i.e., the observing vehicle (also referred to herein as a deep-space vehicle, or a spacecraft of interest) and the reference observer (also referred to herein as a base station, or a reference spacecraft). These relative-range measurements can be computed anywhere in the solar system (and beyond), wherever the spacecraft of interest and the base station can detect the same burst and share their reception information.

Although the bursting events are aperiodic, happening only once per star, GRBs emanate from all directions of the sky with sufficient regularity for navigation. GLINT-based navigation solutions can be continuously updated while on an interplanetary cruise, or in orbit about a destination planetary body, including asteroids.

As a relative navigation solution, GLINT is intended to complement the DSN infrastructure, and the eventual XNAV concepts.

A significant advantage supporting the GLINT implementation is that gamma-ray detectors are currently incorporated on almost all deep space missions and science missions in Earth's orbit, as part of their instrument package. These detectors support the science investigations of space radiation, as well as validation of the composition of elements on planetary bodies.

Several operating gamma-ray detection systems are continuing to actively collect GRB photon data, providing an on-going resource for GLINT analysis. While GRB sources are non-repeating and non-periodic due to their cataclysmic nature, their flux intensity is much higher than most other high-energy celestial sources, including X-ray pulses. Therefore, they yield higher signal-to-noise ratio and more well-defined morphological profile characteristics for burst time comparisons.

An initial study using past and current observed gamma-ray mission data has demonstrated that the relative navigation performance of hundreds of kilometer accuracy is readily available. However, sub-kilometer level positioning is expected to be achieved by the GLINT system using enhanced photon timing and processing algorithms.

Because short bursts tend to contain narrower temporal features that are better suited to high-precision time of arrival comparison, the hard-spectrum nature of these types of bursts may dictate future GLINT detector design decisions for optimized performance. The low photon flux rates make the use of gamma-ray pulses an extreme challenge for practical navigation system. Thus, the more useful gamma-ray sources are those of the high-flux GRB type.

In one aspect, the present invention constitutes a system for Gamma-Ray source Localization-Induced Navigation and Timing (GLINT). The GLINT system comprises a gamma-ray detector sub-system mounted on-board a vehicle of interest for detection of gamma-ray photons from a distant celestial Gamma-Ray Burst (GRB). The gamma-ray detector sub-system is adapted for outputting time-tagged gamma-ray photon data.

The GLINT system is designed with a data processing sub-system operatively coupled to the gamma-ray detector sub-system and configured to process the time-tagged gamma-ray photons data output therefrom. The data processing sub-system includes a Burst Profile Forming Unit operatively coupled to the gamma-ray detector sub-system and configured to accumulate the time-tagged gamma-ray photon data for a duration of the GRB in question and to form a first light curve burst profile for the GRB.

A Bursts Comparison Unit forms a part of the GLINT system which is operatively coupled to the Burst Profile Forming Unit to receive therefrom the first light curve burst profile. The Burst Comparison Unit further receives a second light curve burst profile of the GRB in question detected at a reference station.

The Bursts Comparison Unit is configured to time-align the first and second light curve burst profiles of the target GRB and to compute a time difference of arrival (TDOA) of the GRB at the vehicle of interest and the reference station.

The GLINT processing sub-system further includes a Position Estimate Unit operatively coupled to the Bursts Comparison Unit and configured to compute an estimate of a range of the vehicle of interest relative to the reference station along a line-of-sight to the target GRB based on the computed TDOA.

The GLINT data processing sub-system further includes a Navigation Solution Unit operatively coupled to the Position Estimate Unit and configured for forming Navigation solutions (including position and velocity) for the vehicle of interest.

In one embodiment, the GLINT Data Processing sub-system is mounted on-board the vehicle of interest for autonomous navigation.

In an alternative embodiment, the GLINT Data Processing sub-system resides at a central control station which bi-directionally communicates with the vehicle of interest for data transmission therebetween. The central control station is operatively coupled to the reference station (base station) to acquire gamma-ray photon data, preferably in the form of the second light curve burst profile of the GRB in question detected at the reference station.

The central control station calculates a location, as well as line-of-sight, of the target GRB, determines the position of the reference station, and subsequently calculates a position of the vehicle of interest using the first and second light curve burst profiles, position of the reference station, and the location of the GRB.

The GLINT central control station is based on an Earth Ground Station, which may, for example, include GCN (Gamma-Ray Burst Coordinates Network) system and/or IPN (Interplanetary Network) system.

The vehicle of interest is further equipped with a Vehicle Control Unit operatively coupled to the Navigation Solution Unit, where the Navigation Solution Unit preferably includes a Navigation Solution Update unit employing an Extended Kalman Filter configured for calculation of navigation solution error. The Navigation Solution Update Unit continuously updates the Navigation Solutions based on the calculated position of the vehicle of interest, and submits the updated navigation solution to the Vehicle Control Unit to actuate the spacecraft maneuvers accordingly.

In the GLINT system, the Bursts Comparison Unit is configured to perform at least one of a plurality of burst profile comparison routines selected for comparison of the first and second light curve burst profiles. The selection of one of the comparison routines is based on burst profiles characteristics. The burst profile comparison routines may include Maximum Burst Peak alignment, MATLAB xcorr routine, and FFTFIT routine. Alternatively, Dynamic Time Warping routine may be used as a burst profile comparison routine.

In the GLINT system, the Position Estimate unit is configured to compute a position offset $\Delta r$ between the vehicle of interest and the reference station along the line-of-sight $\hat{n}$ to the target GRB using the equation $$\hat{n}^T \Delta r = c \Delta t,$$

wherein c is the light speed, $\Delta t$ is the time offset of the GRB arrival time at the vehicle of interest and the reference station, and the $\Delta t$ corresponds to the TDOA computed at the Burst Comparison Unit, wherein the line-of-sight $\hat{n}$ to the target GRB is computed at the central control station, wherein $\Delta r = r_{sc} - r_{base}$, wherein $r_{sc}$ is a three-dimensional position of the vehicle of interest $r_{sc}$=relative to the origin of an inertial reference frame, the three-dimensional position $r_{base}$ of the reference station is also relative to the origin of an inertial reference frame, $\Delta r$ is the relative position of the vehicle of interest with respect to the reference station, and T denotes the vector transpose.

In the GLINT system, the gamma-ray detector sub-system preferably includes a scintillator unit, a photon timing board, and an atomic clock operatively interconnected each to the other to produce data including time-tagged photons and photon energies responsive to detection of the target GRB. The gamma-ray detector sub-system preferably includes also an X-ray detector. Where possible, an X-ray detector integrated into the GLINT system can augment the solution, and possibly increase the frequency of observation, using the same method of finding the relative position solution.

In another aspect, the present invention directs itself to a method for Gamma-Ray Source Localization-Induced Navigation and Timing (GLINT). The GLINT method comprises the following steps:

(a) mounting a gamma-ray detector sub-system on-board a vehicle of interest, (b) detecting, by the gamma-ray detector sub-system, gamma-ray photons from a distant celestial Gamma-Ray Burst (GRB), and (c) time-tagging the detected gamma-ray photons.

The method proceeds through the steps of:

(d) accumulating time-tagged gamma-ray photon data for a duration of the target GRB, where the time-tagged gamma-ray photon data include also time-distribution of the intensity of the photon flux.

Subsequently, the GLINT method proceeds by:

(e) forming a first light curve burst profile for the GRB in question, (f) comparing the first light curve burst profile of the target GRB detected at the vehicle of interest with a second light curve burst profile of the GRB in question detected at a reference station remote from the vehicle of interest, (g) calculating a time difference of arrival (TDOA) of the target GRB at the vehicle of interest and the reference station based on the comparison of the first and second light curve burst profiles of the target GRB, (h) computing a line-of-sight to the target GRB, and (i) computing a range of the vehicle of interest position relative to the reference station along the line-of-sight to the GRB in question.

Subsequently to the step (i), the GLINT method performs a step (j) of computing a navigation solution, including positional parameters and velocity, for the vehicle of interest.

In one embodiment of the GLINT method, steps (a)-(g) and (i) (j) are performed at the vehicle of interest for an autonomous navigation mode of operation.

In an alternative embodiment, steps (e)-(j) may be performed at the central control station.

The GLINT method also contemplates computation of a navigation solution error by applying an Extended Kalman Filter routine to the computed navigation solution, and continuously updating the navigation solution accordingly based on computations of the vehicle of interest position.

A burst profile comparison routine for computing the TDOA may be selected out of a plurality thereof based on characteristics of the first and second light curve burst profiles. Preferably, the burst profile comparison routines include a Maximum Burst Peak Alignment Routine, a MATLAB xcorr function routine, the FFTFIT routine, or Dynamic Time Warping routine.

The maximum Burst Peak Alignment routine is selected if the first and second light curve burst profiles manifest well defined intensity peaks which is characteristic for the fast-rise GRBs. The Maximum Burst Peak Alignment routing includes the steps of:

overlaying the first and second light curve burst profiles, finding on the first and second light curve burst profiles respective maximum intensity signals, indicating a first peak at the first light curve burst profile and a second peak at the second light curve burst profile corresponding to the first peak, determining arrival times $t_1$ and $t_2$ of the first peak and the second peak at the vehicle of interest and the reference station, respectively, and calculating the TDOA as a difference between said $t_1$ and $t_2$.

The MATLAB xcorr function routine may be applied to a variety of light curves and includes the steps of:

creating a cross-correlation plot for the first and second light curve burst profiles, determining a peak signal at the cross-correlation plot, computing a value of lag at the peak signal to determine a delta-index value corresponding to a bin offset between the first and second light curve burst profiles, and subtracting the delta-index value from a peak found at the first light curve burst profile, thereby determining the TDOA.

The FFTFIT routine is applicable to all types of GRBs and provides precise results. The FFTFIT routine is based on estimation of fractions of a bin offset between the first and second light curve burst profiles to attain a refined TDOA.

The GLINT method further comprises the steps of:

computing a position offset $\Delta r$ between the vehicle of interest and the reference station along the line-of-sight $\hat{n}$ to the target GRB using the equation $$\hat{n}^T \Delta r = c \Delta t,$$

where $\Delta t$ is the time offset of the target GRB arrival time at the vehicle of interest and the reference station, respectively, the $\Delta t$ corresponds to the TDOA, wherein c is the light speed, and $$\Delta r = r_{sc} - r_{base},$$

wherein $r_{sc}$ is a three-dimensional position of the vehicle of interest $r_{sc} = \{r_x, r_y, r_z\}^T$ relative to the origin of an inertial reference frame, the three-dimensional position $r_{base}$ of the reference station is also relative to the origin of an inertial reference frame, $\Delta r$ is the relative position of the vehicle of interest with respect to the reference station, and T denotes the vector transpose.

For the computations at the central control station, the first and second light curve burst profiles are transmitted to the central control station for subsequent processing thereat. The central control station disseminates the position of the target GRB to participating vehicles or missions.

The GLINT system and method also may be envisioned in various other applications, including, for example, finding a position of a gamma-ray event through processing a known position of the GLINT-equipped vehicle, for example, in terrestrial usages, such as for locating high energy radiation or nuclear detonations.

These and other objects and advantages of the present invention will be apparent from the following detailed description taken in conjunction with accompanying Patent Drawings.

DETAILED DESCRIPTION OF THE PREFERRED EMBODIMENTS

Figure 1:
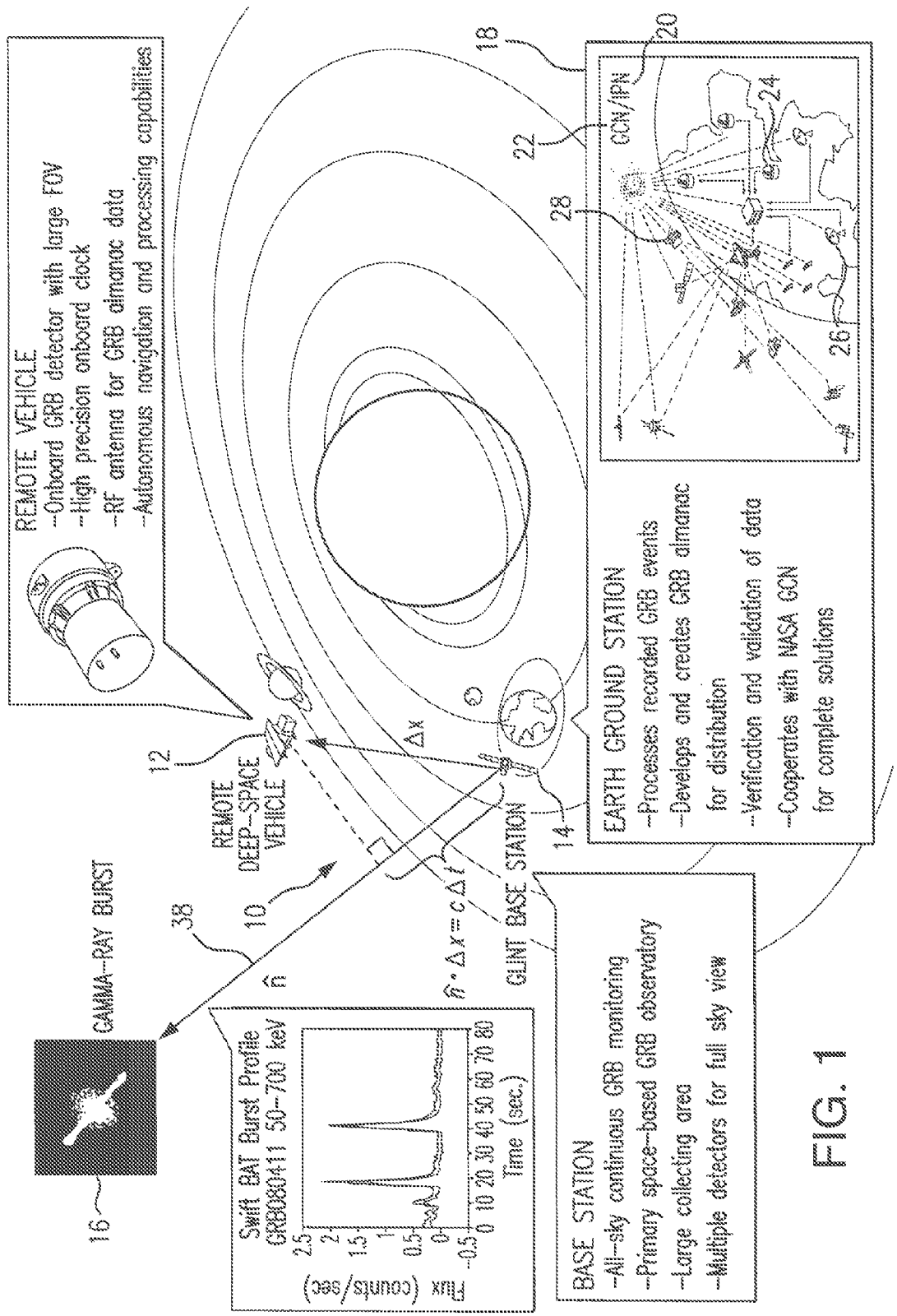
FIG. 1 is a schematic representation of the GLINT concept and architecture for spacecraft navigation.

Referring to FIG. 1, representing the overall GLINT (Gamma-Ray Source Localization Induced Navigation and Timing) concept in an architecture for spacecraft navigation, the GLINT system 10 includes a high-resolution binning gamma ray detector sub-system for detection of gamma-ray photons from distant celestial gamma-ray bursts (GRBs) mounted on a vehicle (spacecraft) of interest 12, also intermittently referred to herein as a remote deep space vehicle (or spacecraft). The GLINT system also includes processor sub-system, mounted either on the spacecraft 12 of interest for an autonomous operation, or may reside and operate at a central control station, or alternatively may be distributed among participating stations in the overall GLINT architecture for the spacecraft 12 navigation.

Another high-resolution binning gamma-ray detector is mounted at a GLINT base station 14, also referred to herein as a reference (or observational) station orbiting the Earth. Both the remote spacecraft 12 and the base station 14, respectively, are shown in FIG. 1, detecting the same GRB event 16.

The Earth ground station 18, among its numerous functions and capabilities supporting the GLINT concept, provides data processing which is used to support the rapid dissemination of GRB data among cooperating vehicles. The Earth ground station 18 is the composition of the Interplanetary Network (IPN) 20 and GCN (Gamma-Ray Burst Coordinates Network) 22 which support the spacecraft and Earth observation systems.

The Interplanetary Network, in existence for over 30 years, is a part of a significant infrastructure which has been built to observe GRBs and rapidly disseminate information about their occurrence and localization. The IPN 20 comprises an inhomogeneous collection of in-space monitoring platforms that triangulate the position of a GRB from the burst arrival time differences between spacecraft. This source localization service by IPN spacecraft provides an architecture for GRB timing and positioning.

The Gamma-Ray Burst Coordinates Network (GCN) 22 established by NASA's Goddard Space Flight Center (GSFC), gathers input from the IPN 20 and optical ground stations 24, as well as radio ground stations 26, to disseminate the position of a GRB event 16 to observers as quickly as possible.

The existing GRB observational infrastructure provides a preliminary basis for the architecture of the operational GLINT system 10. The network of IPN vehicles, many with ongoing and extended missions, along with future planned missions already being equipped with gamma-ray detectors capable of high-accuracy timing, ensures reliability of the data that feed the GLINT system 10.

Historically, detections by many geometrically well-displaced observers of the afterglow of a GRB subsequent to its detection have provided localization of the GRB event on the sky. The known position of each observer assisted with the localization. Today, the Swift mission 28, with its GRB detector plane area of ~4200 $cm^2$, localizes GRBs at the arcsecond levels. The ground- or space-based follow-up in the optical or radio bands can localize afterglows to significantly better than an arcsecond of accuracy.

The multi-spacecraft localization process, as part of the GCN and IPN, improves the analysis of these one-time celestial GRB events. In principal, however, the IPN procedure can be inverted to improve or determine independently the position of any spacecraft 12 capable of detecting a GRB event which has been well localized by the Swift station 28 or ground-based follow-up, as will be detailed in further description.

The operation of the GRB-based system for GLINT range measurement of the remote spacecraft location relative to the base station is based on usage of a high resolution binning detector on-board the base station 14 and a high-resolution binning detector 32 on-board the remote spacecraft 12. Each detector accumulates a respective light curve corresponding to an assemblage of gamma-ray photons from a distant celestial gamma-ray burst 16.

Figure 2:
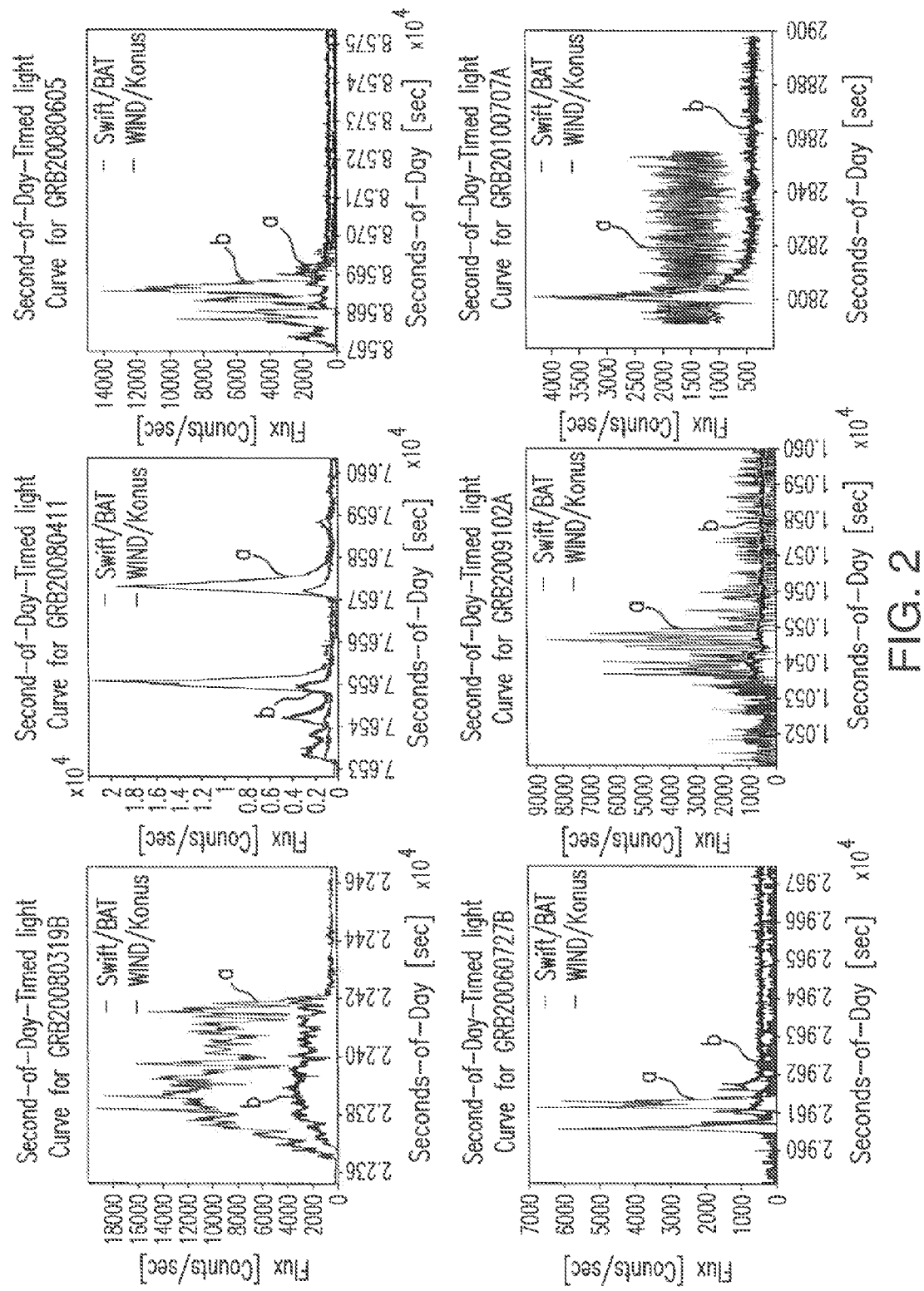
FIG. 2 is a representation of samples of burst profiles for selected GLINT-processed GRBs.

FIG. 2 provides six unique GRB profiles (light curves) recorded by various detector missions, which illustrate the diversity of burst characteristics. In each subplot of FIG. 2, light curve burst profile signals represent the incoming fluxes as received by the respective spacecraft's detector, for example, such as signals "a" detected by Swift/BAT mission, and signals "b" detected by WIND/Konus mission. Differences in flux magnitude between two observing spacecraft, which, as shown, can vary dramatically, are due to the different detector properties on each spacecraft.

Figure 3:
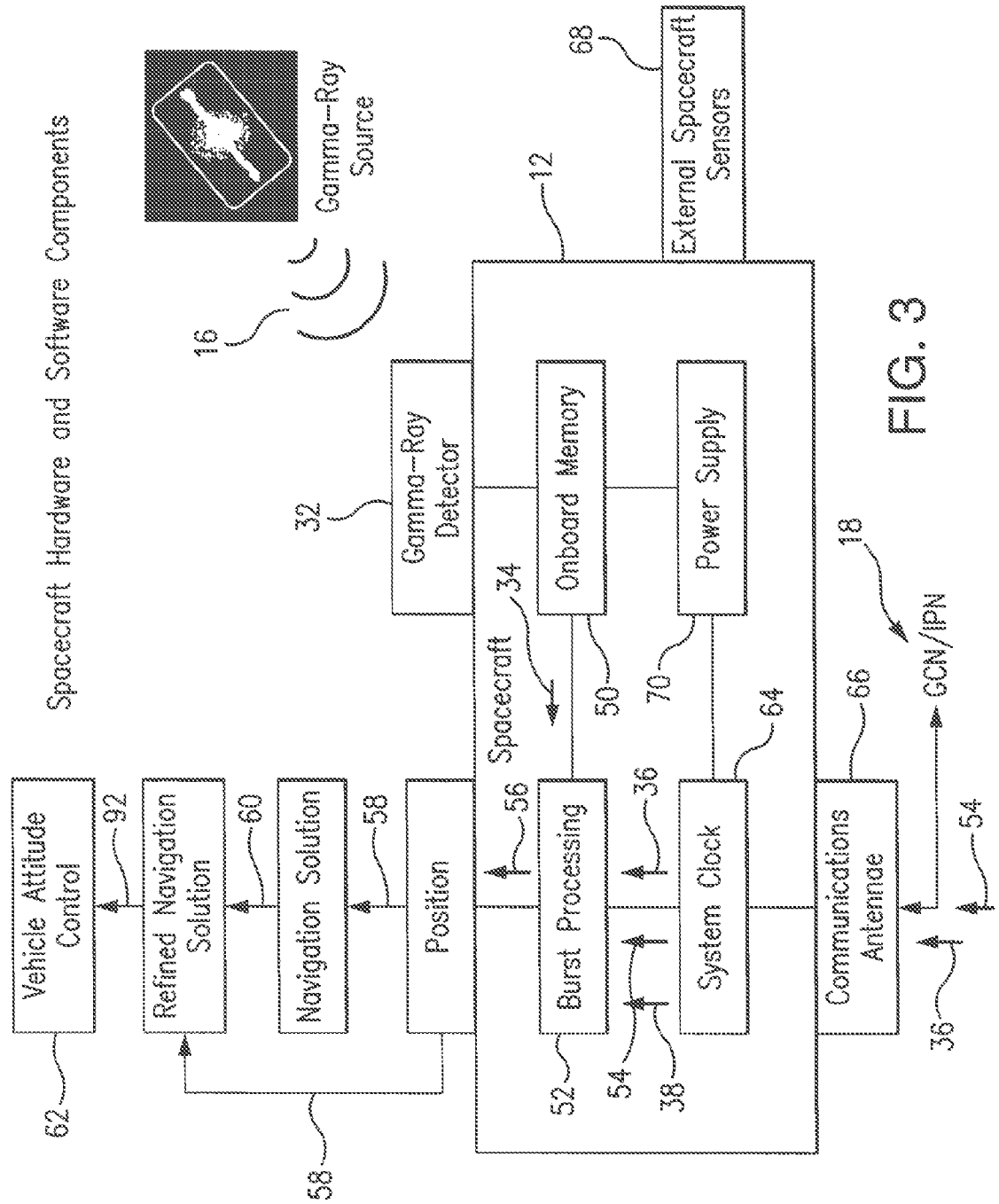
FIG. 3 is a diagram representing GLINT-equipped spacecraft hardware and software components.
Figure 4:
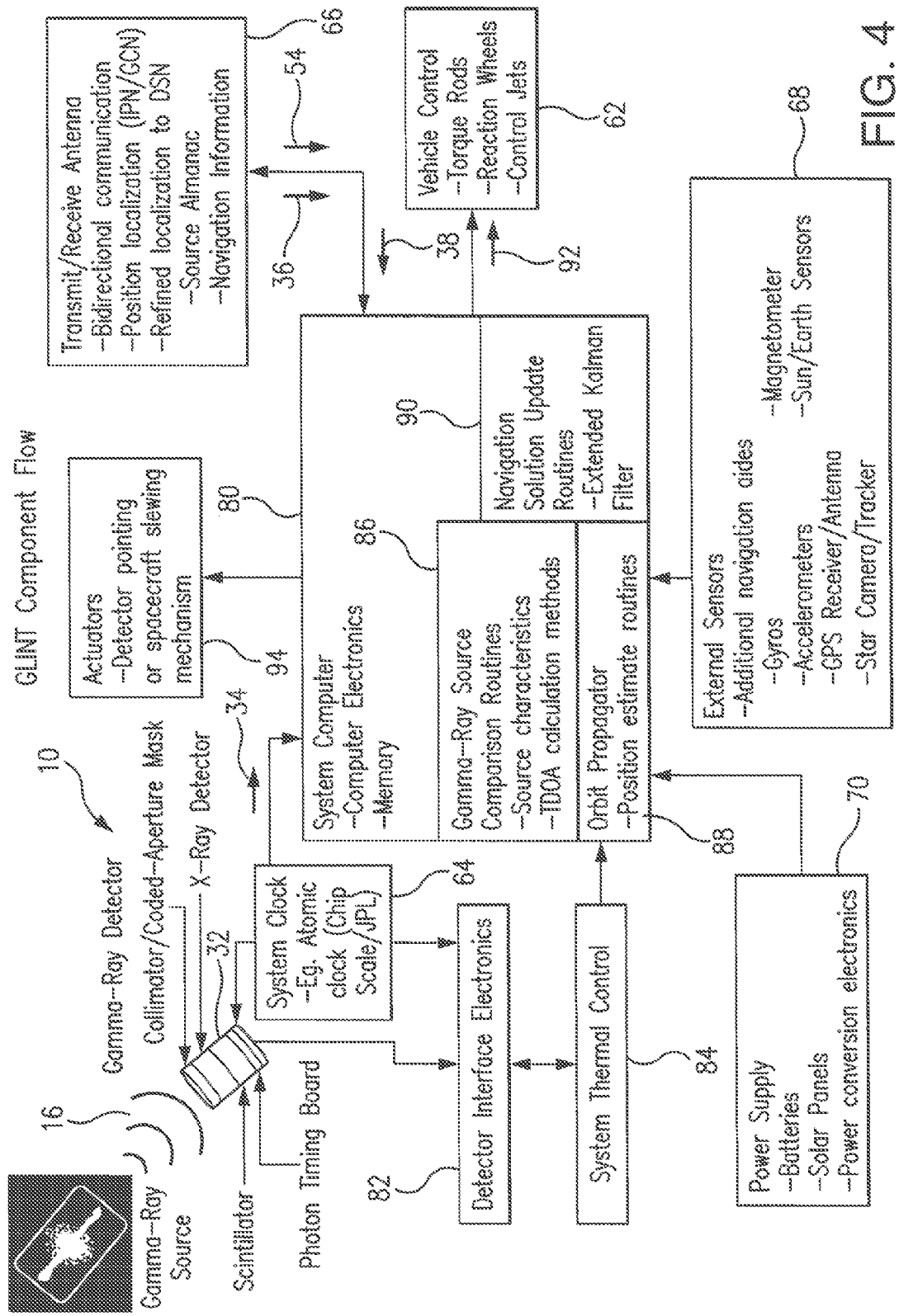
FIG. 4 is a diagram detailing FIG. 3 and representing the GLINT component operative interconnection.

Referring to FIGS. 3-4, a light curve burst profile 34 is accumulated at the remote spacecraft 12 for the duration of the GRB event 16. A light curve burst profile 36 is accumulated at the base station 14, for example, the Swift mission, for the duration of the gamma-ray burst. The light curves 34 and 36 may be accumulated at the vehicles' respective Data Processing subsystems using fine-resolved time-tagged photon arrival times to ensure precise and accurate observations.

Subsequently, the accurate line-of-sight 38 n̂ (shown in FIGS. 1 and 9) to the GRB source is determined and disseminated by the IPN/GCN system, i.e., the Earth ground station 18, once the GRB has been precisely localized. To provide the required GRB localization accuracy, the GLINT base station 14 would require the Swift-like arcsecond localization capabilities, or an optical follow-up (ground or space).

The GLINT-equipped remote spacecraft 12 would use the base station's 14 template light curve profiles and its own observed data, along with the known accurate sky position disseminated by the IPN/GCN system 20, 22, to compute the time difference of arrival (TDOA) of the burst between the base station 14 and the remote spacecraft 12. Using this measured burst TDOA, the remote spacecraft can compute its position relative to the base station 14. Subsequently, a navigation solution incorporating the measured relative distance can be updated, providing a refined navigation solution, as will be detailed further herein.

GLINT processing subsystem uses a distinction between the light curve 34 detected at the remote spacecraft 12 and the light curve 36 detected at the base station 14, along with a known accurate sky position 54 of the target GRB determined by the IPN/GCN system, to compute the time difference of arrival TDOA of the burst at the base station 14 and the remote spacecraft 12, and the location of the vehicle of interest 12, as will be detailed further herein.

As presented in FIG. 3, in order to provide GLINT capabilities, the remote spacecraft 12 is equipped with a gamma-ray detector 32 for detection of the GRB event 16 produced by the gamma-ray source. The on-board Memory 50 is operationally coupled to the gamma-ray detector 32 to accumulate gamma-ray photons for the duration of the gamma-ray burst using fine-resolution photon arrival times. In one embodiment, a Burst Processing Unit 52 resides at the spacecraft 12. In an alternative embodiment, the Burst Processing Unit 52 may reside at the Earth Ground Station 18. In any implementation, the Burst Processing Unit 52 is operatively coupled to the on-board memory 50 (which accumulates the light curve burst profile 34), and the template light curve burst profile 36 accumulated at the base station for computing the TDOA 56 of the burst between the spacecraft 12 and the base station 14.

In the autonomous navigation mode of operation, using the measured burst TDOA 56, the remote spacecraft 12 computes its position 58 as a distance relative to the base station 14 along the line-of-sight to the GRB source.

A navigation solution 60 incorporating the measured relative distance 58 is continually updated, and the refined navigation solution 92 is supplied to the Vehicle Attitude Control Unit 62 for actuating the navigation control accordingly.

A high-precision System Clock 64 is provided at the remote spacecraft 12 to support the time-stamping of photons for the accumulation of the light curve burst profile using fine-resolution time-tagged photon arrival times to ensure precise and accurate observations, as well as to support time related computations and data, such as the determination of the time of the detected event, trigger time which specifies a starting time for the event, and individual bin time stamps, as well as time offset of the burst arrival time at two spacecraft.

Communication Antennae Unit 66 is provided at the remote spacecraft 12 for all necessary communications including communications with a GCN/IPN system 18 and the base station 14.

External Spacecraft Sensors Unit 68 is provided for detecting and recording numerous parameters which can be used as an additional navigation aid. A Power Supply Unit 70 is provided to power the operation of the spacecraft hardware and software components.

Figure 19:
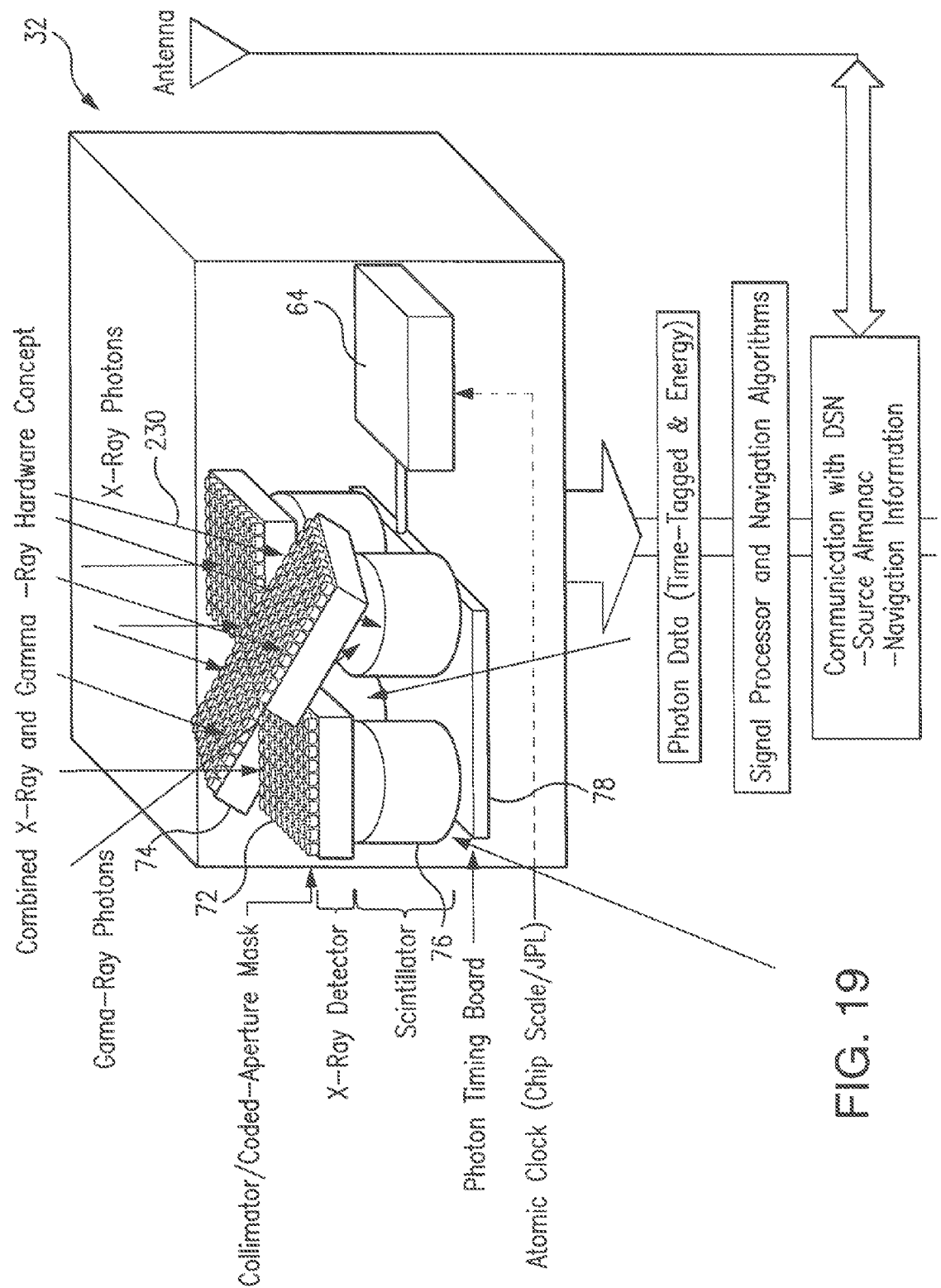
FIG. 19 is a schematic representation of the combined X-ray and gamma-ray detector concept used for the GLINT system and method.

Referring to FIG. 4, which is a detailed schematic representation of the operative interconnections between components of the GLINT equipped remote spacecraft 12, the GRB event 16 is detected by the gamma-ray detector 32 which will be detailed in further paragraphs in reference to FIG. 19.

The photon data, including time-tagged photon arrival times and energy, are provided to a System Computer 80 through the Detector Interface Electronics 82 and the System Thermal Control Unit 84.

The System Clock 64, such as, for example, an Atomic Clock (Chip Scale/JPL) is operatively coupled to the gamma-ray detector 32 to support production of the time-tagged photon data.

The System Clock 64 is also coupled to the Detector Interface Electronics 82 and the System Computer 80 for the operation synchronization between these units. The System Computer 80 includes the Computer Electronics for data processing, computation of the spacecraft position, computation of navigation solutions, and navigation solution updates, and the Memory Unit 50 to support the computations and data storage.

The System Computer 80 is configured to perform Gamma-Ray Source Comparison Routines in block 86 based on the GRB source characteristics and TDOA calculation methods which will be detailed in following paragraphs.

The System Computer 80 also includes an Orbit Propagator Unit 88 to perform position estimate routines. The System Computer 80 further includes a Navigation Solution Update Routine unit 90 which may use an Extended Kalman Filter for a refined navigation solution.

As shown in FIGS. 3-4, the System Computer 80 is bi-directionally coupled to the Communications Antennae Unit 66 through which the accurate line-of-sight 38 to the GRB source (which is disseminated by the IPN/GCN system) is acquired at the System Computer 80.

Based on the processing of the light curve burst profile 34 accumulated for the duration of the gamma-ray burst at the remote spacecraft 12, and the base station template light curve burst profile 36 along with the accurate sky position 54 received from the IPN/GCN system, the System Computer 80 performs gamma-ray source comparison routines and computes the time difference of arrival TDOA of a corresponding peak found on light curve 34 detected by the GRB detector 32 from the spacecraft 12 and 14. Using this measured burst TDOA, the System Computer 80 computes the position of the remote spacecraft 12 relative to the base station 14 in the Orbit Propagator Unit 88, and further computes the Navigation Solution 60 incorporating the measured relative distance 58.

The navigation solution 60 is continually updated in the Navigation Solution Update Routine unit 90 to provide a refined navigation solution 92 to the Vehicle Control Unit 62 to control the torque rods, reaction wheels, and control jets in accordance with the signal 92. The refined localization 92 would also be supplied to the DSN system for updating the source almanac and navigation information. The System Computer 80 is also coupled to the Actuators 94 which would affect the detector pointing or spacecraft slewing mechanism.

The External Sensors Unit 68 is coupled to the System Computer to supply additional navigation data which may include operational data of Gyros, accelerometers, GPS Receiver/Antenna, Star Camera/Tracker, Magnetometer, Sun/Earth sensors, etc.

The Power Supply Unit 70 may be in the form of batteries, solar panels, power conversion electronics, etc.

Figure 5:
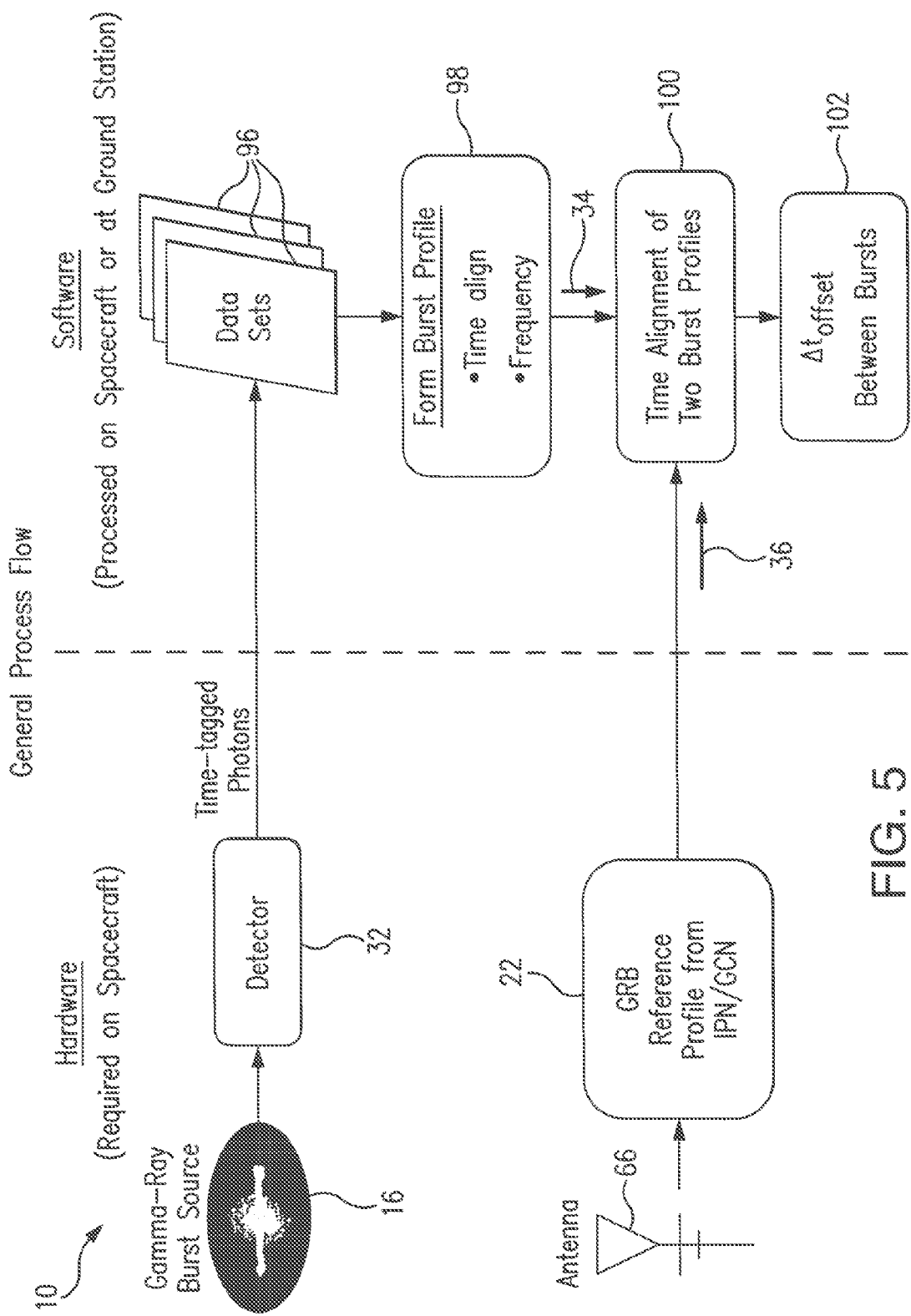
FIG. 5 is a schematic diagram representing the GLINT process flow underlying the operation of the present system.

Referring to FIG. 5, the hardware required on the spacecraft 12 includes a detector 32 for detection of the GRB event 16 from the gamma-ray burst source and the Transceiver Antenna 66 for exchanging data with central control station and the base station. The Antenna 66 serves to receive the GRB reference profile, such as the base station template light curve burst profiles from the base station 14, and/or from the IPN/GCN system, and for receiving the accurate sky position disseminated by the IPN/GCN system, which may be needed for autonomous navigation.

The software for GLINT processing may reside at the spacecraft 12 for the autonomous operation or at the central control station, as will be detailed further in reference to FIGS. 16A-16B and 17-18.

As shown in FIG. 5, the time-tagged photons are transmitted to the data sets 96 and are accumulated for the duration of the gamma-ray bursts. Observational data related to the GRB in data sets 96 primarily include the time of the detected event, its location and a table of photon count data over a specified time interval. Data from data sets 96 are provided to the "Form Burst Profile" unit 98 to form the light curve burst profile 34, i.e., the light curve data file which is characteristic of the shape and intensity of the GRB in question for its duration.

The burst profile 34 formed in the unit 98 is further transmitted to the "Time Alignment of Two Burst Profiles" unit 100 for time-alignment with the GRB reference profile 36 acquired at the base station 14.

In addition, the position of the base station 14 at each time during the burst event is disseminated by the IPN/GCN system and received at the remote spacecraft 12. As a result of processing in block 100, the TDOA ($\Delta t_{offset}$) between the corresponding bursts found on the light curves 34 at the remote spacecraft 12 and the light curve 36 accumulated at the base station 14 is calculated in the unit 102. The components 96, 98, 100, and 102 of the GLINT data processing sub-system may reside at the spacecraft 12 or at the central control station, such as, for example, the Earth Ground Station 18. The light curve profile 36 accumulated at the base station 14 may be transmitted to the "Time Alignment" unit 100 either from the base station 14 or from the IPN/GCN system.

Among the primary components of the light curve files 96 found in public databases or obtained by permission of the mission scientists are an event trigger time, which specifies a starting time, $t_0$, for the emission event, individual bin time stamps, and total photon counts in each time bin. The data set 96 can be compared between mutually observing spacecraft to improve knowledge of the relative positions of the spacecraft by correlating the difference of the time of arrival between detections.

Figure 9:
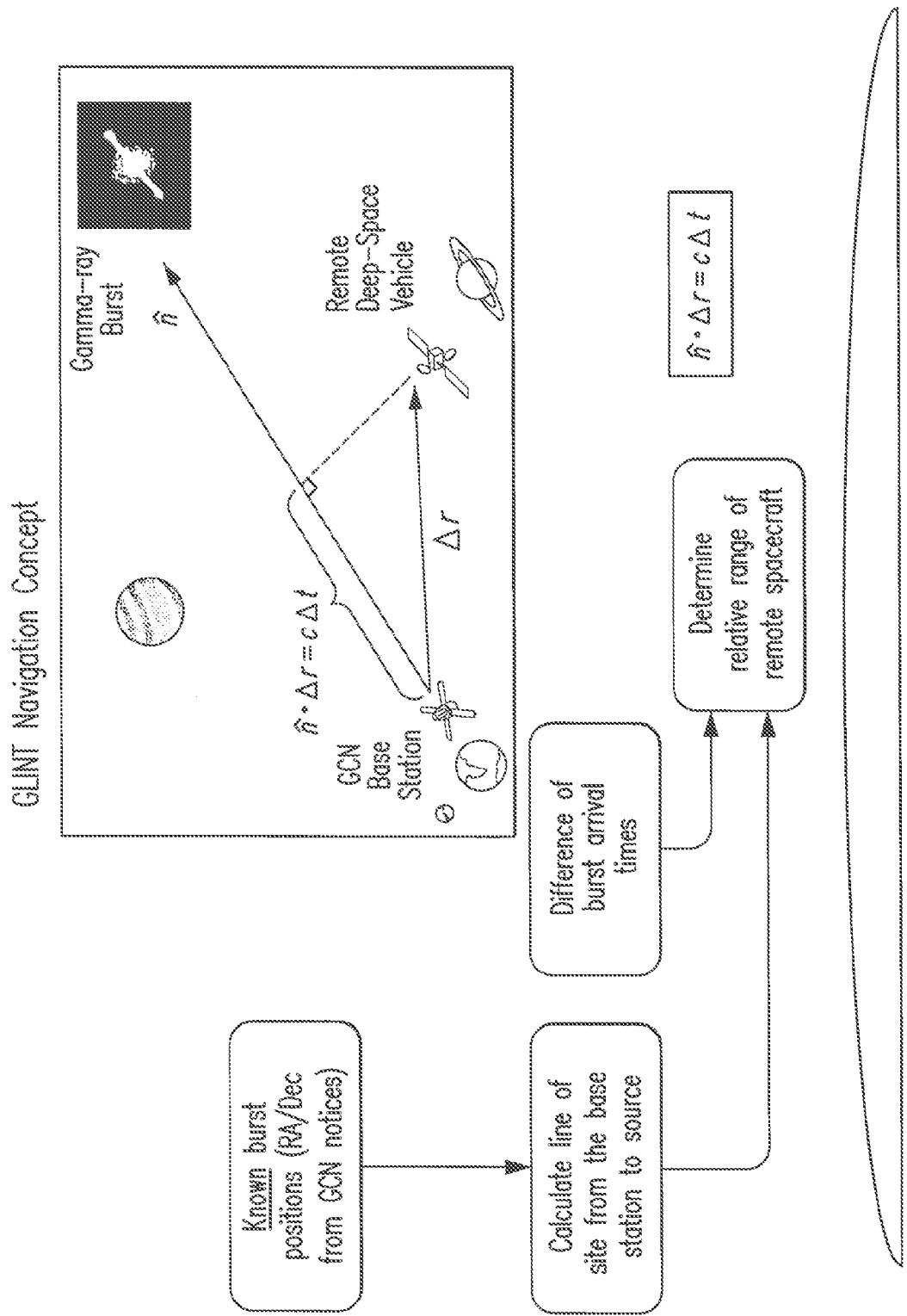
FIG. 9 is a schematic diagram representing the GLINT navigation concept based on observations of a GRB event at a base station and a remote spacecraft.

It is seen in FIGS. 1 and 9, the time offset, $\Delta t$, of the burst arrival time at two spacecraft 12 and 14, is related to their position offset, $\Delta r$, along with the unit line of sight to the GRB, $\hat{n}$, in accordance with Eq. 1, where superscript T denotes the vector transpose:

$$\hat{n}^T \Delta r = c \Delta t \qquad \text{Eq. (1)}$$

Figure 6A:
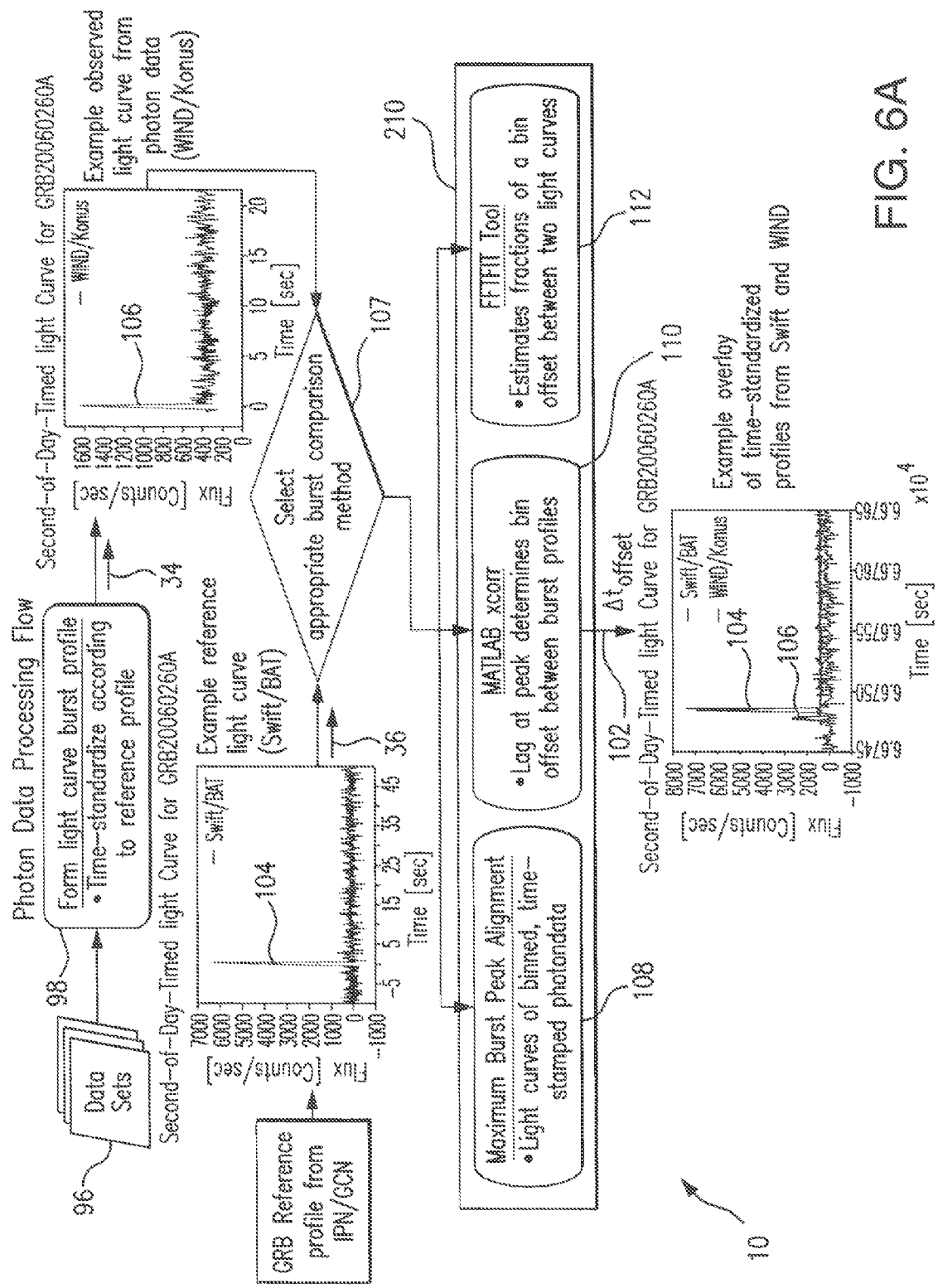
FIG. 6A is a diagram representing photon data processing flow in the GLINT system.
Figure 6B:
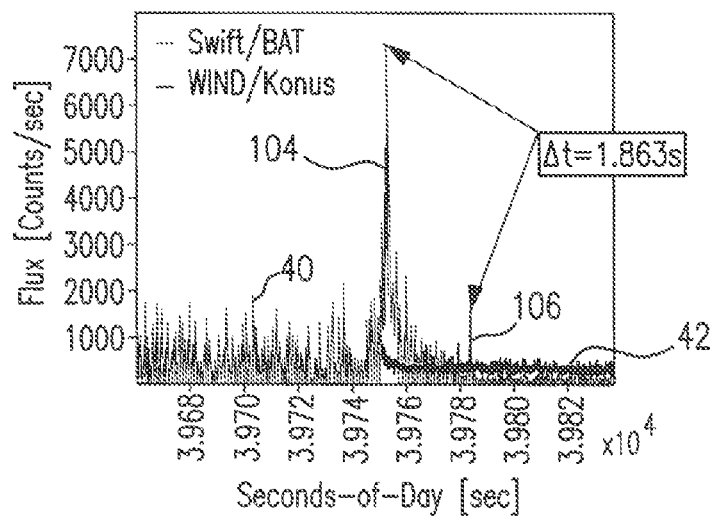
FIG. 6B is a diagram of a FRED-type burst yielding accurate TDOA values.

In order to simulate the GLINT processing techniques, GRB light curve data containing assemblages of time-tagged photons were acquired from representative missions. As time-tagging of incoming photons is performed with respect to mission-specific timescales, burst data are first time-standardized in block 98 to seconds-of-day Universal time UT1. An example burst, GRB20110420A as observed by Swift and WIND, is shown in FIGS. 6A-6B. This burst featured a fast rise 104 in photon counts, as seen in the Swift/BAT light curve 40.

As shown in FIG. 6B, the WIND mission observed profile 42 produced a corresponding energetic spike 106, which was observed 1.863 seconds later, according to the difference in times of the profile peaks 104 (on the Swift observed profile 40) and 106. Close inspection of the profile 42 observed by WIND shows the corresponding spike to be the offset feature rather than the decreasing relative maximum at the start of the WIND data. Differences in the magnitude of flux between the peaks 104 and 106 observed by Swift and WIND, respectively, are due to differences in detector energy ranges. This TDOA measurement between profiles represents the delay of the arrival of the burst between the Swift and WIND vehicles, as Swift is in a high Earth orbit, and WIND is at the Earth-Sun L1 Lagrange point.

Based upon the known spacecraft locations at the detection times of this burst's peak (received from the IPN/GCN system), the measured geometry-based offset along the line of sight to the burst is 1.947 seconds. The difference between the known geometrical offset and the TDOA measurement is therefore 84 ms.

Using Eq. (1) this geometrical-based time offset versus observed time offset discrepancy yields a position uncertainty of greater than 20000 km. However, the limitation of the burst profile's bin size of 64 ms for both Swift and WIND largely contributes to this computed uncertainty (~2 bins). Moreover, even with this potentially large uncertainty, this simple example based upon peak arrival time of binned photon data effectively demonstrates the GLINT concept.

To extend this GLINT concept to improved capabilities, refined cross-correlation methods with the ability to attain time uncertainties less than 1 ms with existing GRB observation data are described infra.

As shown in FIG. 6A, to support the evaluation of existing GRB data for TDOA measurements in navigation, multiple methods 210 of comparing and time-aligning GRB light curves have been devised. These methods, described in further detail further, include a Maximum Burst Peak Alignment routine 108, a MATLAB cross-correlation function routine 110, and a Fourier-Domain Burst Phase Alignment routine 112.

A GLINT burst TDOA analysis tool was created to process binned light curve data from multiple data sets 96 of two specified spacecraft 12 and 14. Once time-standardized light curves from the pre-processed photon data are generated, an Earth-Centered Inertial (ECI) light-of-sight (LOS) is calculated for the detected GRB event to the spacecraft using its right ascension and declination (RA/DEC) values provided through GCN's burst alert notices.

Figure 7A:
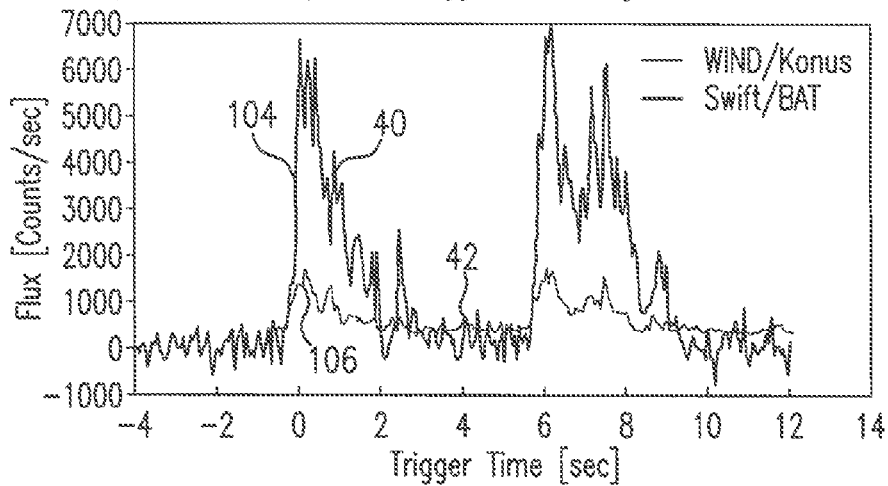
FIGS. 7A-7B, are comparison diagrams using two GRB instruments for GRB080727B, using trigger time (FIG. 7A) and second-of-day (FIG. 7B)
Figure 7B:
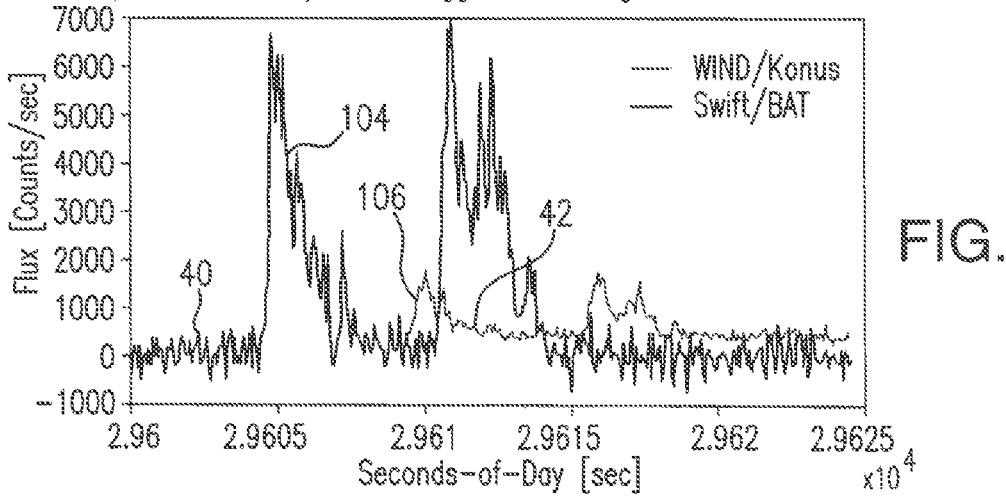

In order to validate the TDOA value between spacecraft 12 and 14 for each burst, the GLINT system references the spacecraft position at the time of peak emission. To carry out this function, the spacecraft ephemeris data are read in and the spacecraft position is determined at the peak time in the light curve, using a piecewise cubic hermite interpolation of spacecraft ephemeris data to find the position at the time of peak emission during the burst. FIGS. 7A-7B show the GRB pulse alignment from two observing vehicles, for example, WIND/Konus and Swift/BAT, first by aligning the pulse peaks 104 and 106 according to the detector trigger time (FIG. 7A), noted in the GCN alerts, and then by a second-of-day timing (FIG. 7B), according to the actual photon-measured arrival time at the vehicle.

As shown in FIG. 6A, two light curves, 40 and 42, acquired from SWIFT/BAT and WIND/Konus, respectively, or 34 and 36, acquired by the vehicle of interest 12 and the reference station 12, are provided to the logic block 107, which, based on the characteristics of the light curve burst profiles to be processed, makes a decision as to which of the burst comparison routines to select. Upon selection of the routine, the light curves 34 and 36 are supplied to the cross-correlation unit 210 for further processing with the goal to determine Δt offset between the light curves in question.

The Maximum Burst Peak Alignment routine 108 compares the burst peak arrival times. The light curve profiles for a selected burst, as seen by two or more spacecraft are overlaid according to their binned, time-stamped data. The exact second-of-day time of the observed maximum intensity value corresponding to the burst peak are recorded. The TDOA measurement is the difference of the burst peak times between vehicles.

Figure 14:
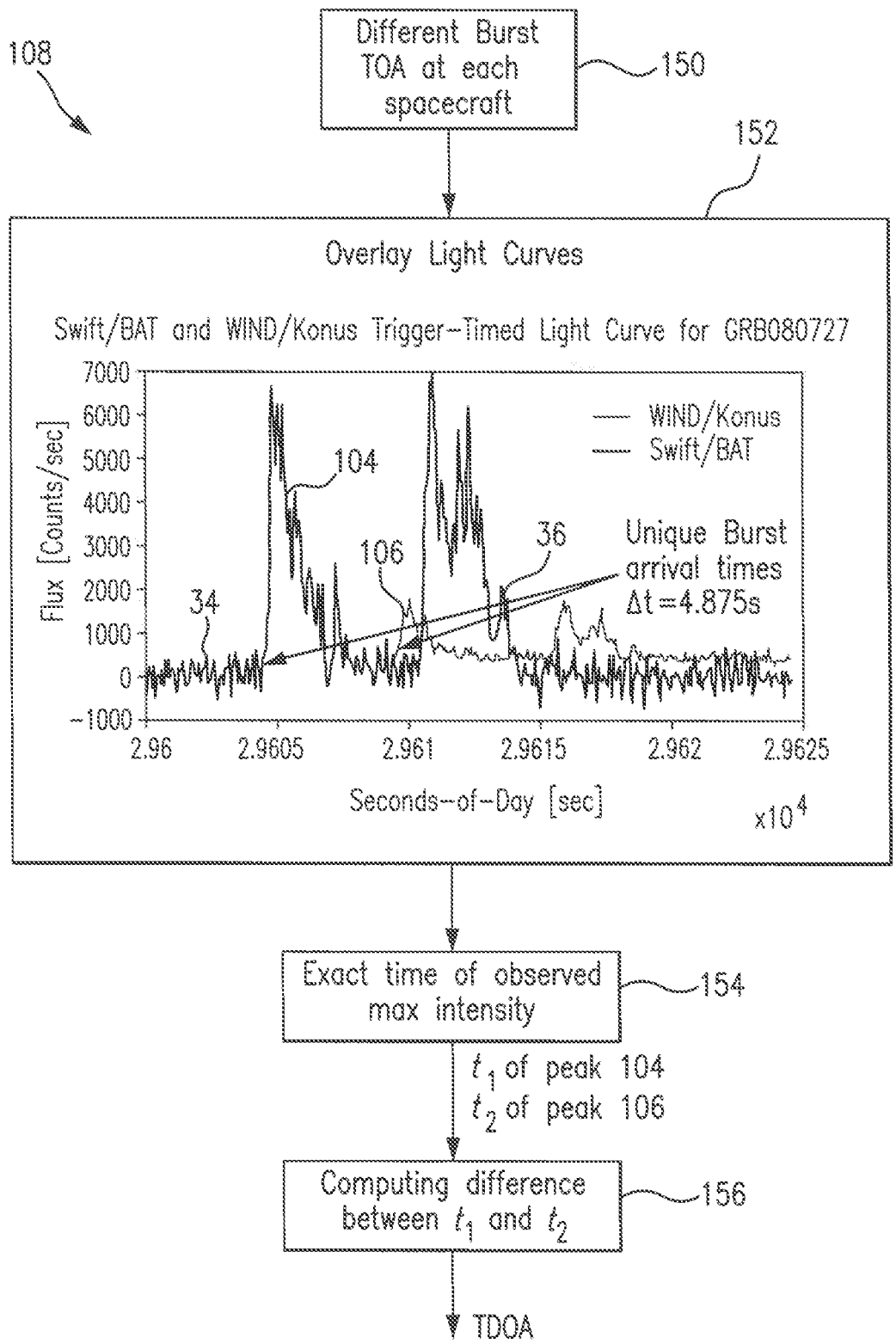
FIG. 14 is a diagram representing the Maximum Bursts Peak Alignment routine.

Referring to FIGS. 6A and 14, the Maximum Burst Peak Alignment technique 108 uses the light curve burst profiles for a selected burst event, as seen by two or more spacecraft, which are overlaid according to their binned time-stamped data. FIG. 14 is a flow chart diagram of the Maximum Burst Peak Alignment routine 108 which is selected in the logical block 107 of FIG. 6A based on the characterization of the observed GRB event. The Maximum Burst Peak Alignment routine is applicable for most fast-rise burst exhibiting well defined peaks on the light curve burst profile.

The algorithm underlying the Maximum Burst Peak Alignment routine 108 starts in block 150 "Different Burst TOA at each spacecraft" where different burst arrival times at each instrument, i.e. the gamma-ray detector at the spacecraft of interest 12 and the reference spacecraft 14 are determined, and the difference between unique burst arrival times is calculated.

From block 150 the logic flows to block 152 "Overlay Light Curves" where the light curve burst profiles 34 and 36 of binned, time-stamped, data are overlaid. As seen, both light curve burst profiles 34 and 36 exhibit energetic spikes 104 and 106, respectively. The peaks 104 and 106 on the light curve burst profiles 34 and 36, respectively, observed by the spacecraft in question and the reference spacecraft, are offset in their arrival times.

From block 152, logic flows to block 154 "Exact Time of Observed Max Intensity" where the exact time $t_1$ of the peak 104 and exact time $t_2$ of the peak 106 arrival at each corresponding detector is determined. The logic calculates the difference between $t_1$ of the peak 104 arrival and $t_2$ of the peak 106 arrival in block 156. This time difference of arrival measurement between profiles represents the delay of the arrival of the burst peaks between the spacecraft in question and the reference spacecraft.

Broader GRBs that lack the fast rise burst are not as easily compared by the Max Peak Alignment technique. However, the rapid increase in flux at the initial burst emission lends itself to the multiple sharp maxima for this burst, resulting in accurate TDOA determination.

To improve upon the performance of the GRB profile time alignment and utilize all the burst's photon data, TDOA determinations for the GRBs using a burst profile cross-correlation of the light curves was accomplished using MATLAB's xcorr. This function uses two burst profiles as input, and its output of the cross-correlation lags indicate the individual bin offset between burst profiles.

Figure 15:
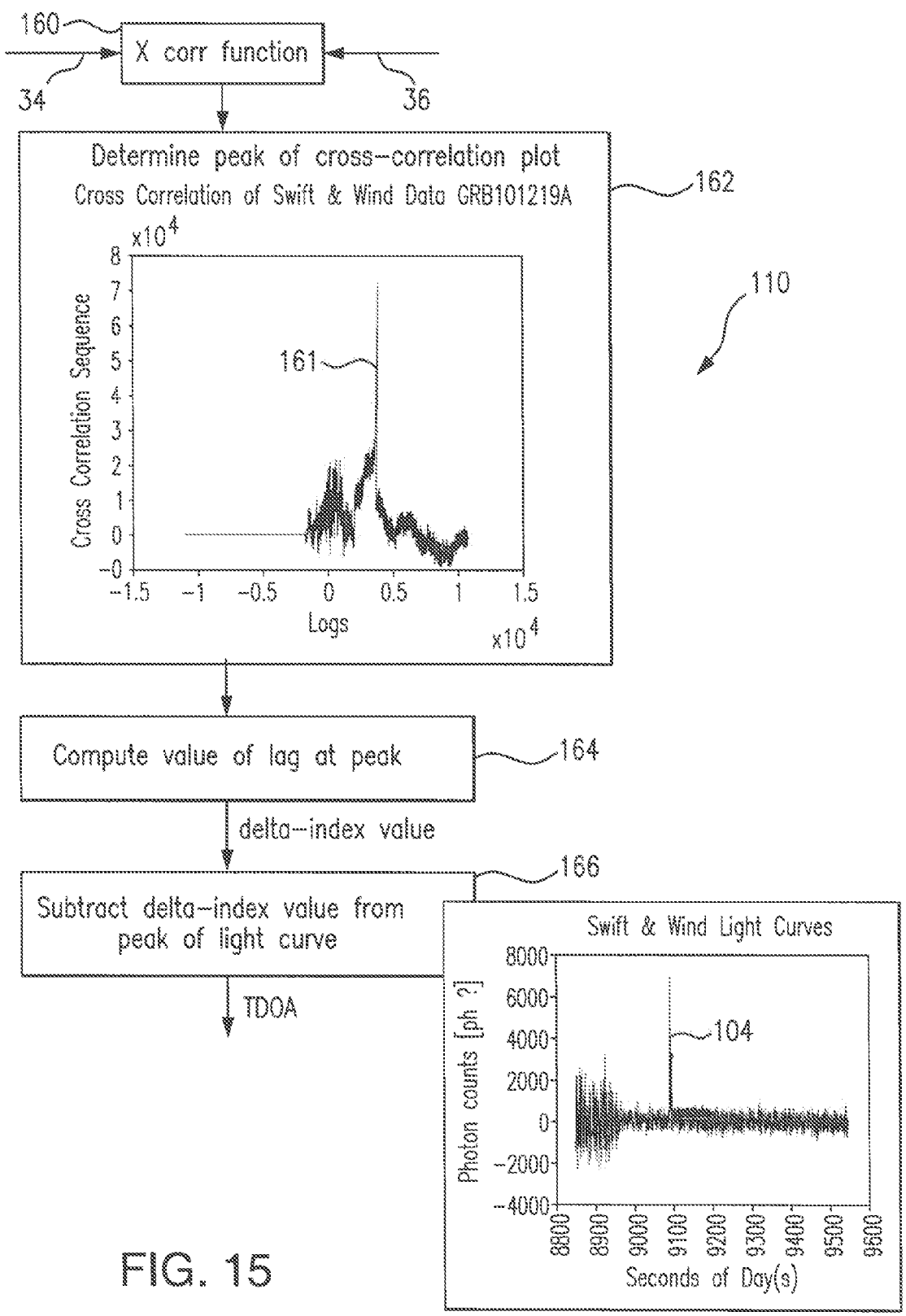
FIG. 15 is a diagram representing the MATLAB xcorr function routine.

Presented in FIGS. 6A and 15, the burst profile cross-correlation routine 110 is based on the MATLAB xcorr function which estimates the cross-correlation sequence of a random process. As shown in FIG. 15, the routine is initiated in block 160 where two light curve intensity profiles, i.e., profile 34 from the spacecraft of interest 12 and profile 36 from the reference spacecraft 14 are provided to xcorr function which produces an estimate of the correlation between these random sequences.

The MATLAB xcorr function is known to those skilled in the art and is not intended to be described herein in detail.

In application to the subject system and method, the xcorr function, using the light curve intensity profiles, determines in block 162 a peak 161 of cross-correlated plot. Further, in block 164, the logic produces the value of lag at the peak 161 to determine delta index value, and in block 166 determines TDOA by subtracting delta–index value from the peak 104 of the light curve profile 40 acquired at the spacecraft of interest 12.

The MATLAB xcorr based routine 110 works well for most GRB observations and may require additional processing to remove pre-burst and post-after-glow data. This technique may need light curve normalization and trimming to improve processing.

A Fourier domain cross correlation analysis of GRB profiles was accomplished using the Fast Fourier Transform Fit (FFTFIT) algorithm (as shown in FIG. 6A) (Taylor, J. H., "Pulsar Timing and Relativistic Gravity," *Philosophical Transactions: Physical Sciences and Engineering*, Vol. 341, Issue 1660, pp. 117-134) to produce a more refined TDOA result than the Maximum Burst Peak Alignment and Burst Profile Cross-Correlation.

This FFTFIT technique and software tool has been previously developed for radio and X-ray pulsar timing analysis. A recent implementation is part of the overall PSRCHIVE software package (Van Straten, W., et al., "Pulsar data analysis with PSRCHIVE," *Astronomical Research and Technology*, Vol. 9, No. 3, 2012, pp. 237-256). This tool estimates fractions of a bin offset, or lags, between two light curves without attempting to derive an arrival time of the peak for each.

As FFTFIT resolves TDOA lags as a small fraction of a time bin, for bursts that have desired profile characteristics for good processing candidacy, TDOA resolutions are improved using FFTFIT over both peak alignment and cross correlation methods. Many of the TDOA lags computed by FFTFIT were on the order of a hundredth of a bin, yielding accuracies less than a millisecond using bin sizes for analyzed observations ranging from 32 to 64 ms. The benefit of the FFTFIT processing tool is the ability to correlate bursts with broader morphological profiles than the previous two methods.

As an addition to the Maximum Burst Peak Alignment, MATLAB xcorr and FFTFIT routines for determining Δt offset, a Dynamic Time Warping technique is also contemplated as one of the burst comparison methods in the GLINT system.

It is clear that although the GLINT processing is described with regard to the simulation based on light curves 40 and 42 accumulated by the Swift and WIND missions, the principles of the processing simulation are readily applicable to processing of actually accumulated light curves, such as the light curves 34 accumulated at the remote vehicle 12 and the light curve 36 accumulated at the base station 14.

GRB Time Offset Computation Results

Data from existing spacecraft and instruments were investigated, including both Earth-orbiting and deep space vehicles. These instruments included the BAT on-board Swift, Konus on-board WIND, the Anti-Coincidence Shield of the Spectrometer on-board INTEGRAL (SPI-ACS), the Wide Area Monitor (WAM) of Suzaku, MESSENGER's Gamma-Ray Neutron Spectrometer (GRNS), and Mars Odyssey's High Energy Neutron Detector (HEND). Photon fluxes measured by the instruments on-board most spacecraft have been stored in timed bins, with the bin size varying between instruments. TDOA measurements demonstrated agreement between multiple methods including maximum burst peak, burst cross-correlation, and FFTFIT. The measured TDOA from each method and the actual known vehicle geometry-based time offset were compared to compute the number of bins of accuracy achievable.

Most GRB events, including GRB20080727B shown in FIGS. 7A-7B, featured distinct periods of emission, which could be easily correlated with the corresponding energetic spike seen by another spacecraft for which methods such as maximum burst peak is applicable. Precise TDOA calculations for bursts displaying chaotic and noisy structures, for instance, GRB20080319B, are more difficult to achieve using the maximum burst peak method, lacking well-defined features to isolate. The same holds true for bursts exhibiting plateau profiles with long and broad features on the time axis.

The maximum burst peak-based analysis provides a basic approach for comparing GRB TDOAs. However, this simplified technique only analyzes the time of the maximum photon count values, and does not effectively utilize all known data present within each burst. Analytically cross-correlating the two burst profiles using the Burst Profile Cross-Correlation and FFTFIT methods provides improved solutions.

Using the known spacecraft geometry, an analysis of the xcorr cross-correlation technique indicates equally good or better results as the maximum burst peak method. In many cases where the burst does indeed display morphologies of sharp peaks or distinct, well separated features (e.g., GRB20080727B), the peak time alignment method results are slightly better than cross-correlation, as the latter method attempts to align the entire temporal profile of the burst, much of which can contain noise that distorts the light curve.

However, in cases where the GRB profile lacks a defined feature like a sharp peak (e.g., GRB20080319B), cross-correlation using xcorr of the light curves yields an improved TDOA, with uncertainties of two time bins or less. Accurate alignment using peak time estimates is ineffective using these types of bursts, as their profiles can be too broad and chaotic for isolating and windowing individual time-specific features.

For a preliminary GLINT concept analysis, several dozen representative GRB-spacecraft pairings were analyzed using the above presented TDOA comparison techniques. All bin offsets for processed TDOA calculations were within four bins of accuracy, with many measurements within a fraction of a bin of precision representing uncertainties of 1 ms or less. As anticipated, bursts with sharp, energetic peaks and short durations are found to yield the most accurate TDOA comparisons. A small sample of nine processed bursts is provided in Table 1.

TABLE 1

GLINT Timing Resolution Capabilities.

| GRB Identifier | Spacecraft Observer #1* | Spacecraft Observer #2* | Max Peak Alignment Resolution [#Bins] | Burst Profile Cross Correlation Resolution [*Bins] | FFTFIT Resolution [#Bins] | FFTFIT Uncertainty [#Bins] |
|---|---|---|---|---|---|---|
| 20100625A | Sw | I | 0.516 | 0.828 | 0.036 | — |
| 20100625A | Sz | W | 0.297 | 0.078 | — | — |
| 20100625A | Sz | I | 0.719 | 0.688 | 0.103 | — |
| 20101219A | W | Sw | 0.188 | 0.188 | 0.188 | 0.052 |
| 20111113A | W | I | 2 | 2 | 0.094 | 0.020 |
| 20111121A | Sz | Sw | 0.047 | —** | — | — |
| 20111121A | W | Sw | 0.266 | 0.266 | 0.209 | 0.036 |
| 20111121A | W | Sz | 0.047 | 0.047 | — | — |
| 20120324 | W | Sw | 0.641 | 2 | 0.986 | 0.191 |

*Sw = Swift/BAT; Sz-Suzaku/WAM; W = WIND/Konus; I = INTEGRAL/SPI-ACS
**Calculation not possible Limitations of TDOA bin resolution have been shown to depend largely on current photon data formats and binning sizes. Most GRB detector mission bin sizes are between 32 and 64 ms. Through advances in timing capabilities, this bin timing is expected to be capable of improvement to 1 ms-bins. The Konus instrument on-board WIND is currently capable of 2 ms bin resolution for some triggered bursts. (Aptekar, R. L., et al., "Konus-Wind Observations of the New Soft Gamma-Ray Repeater SGR 0401+4516," *The Astrophysical Journal*, Vol. 698, No. 2, 2009, pp. 82-85). Further advancement is likely, with the recent progress of technologies such as, for example, the JPL Deep Space Atomic Clock (DSAC), capable of sub-ns time uncertainties. (Tjoelker, R. L., et al., "Mercury Atomic Frequency Standard Development for Space Based Navigation and Timekeeping," *Proceedings of the 43$^{rd}$ PTTI*, 2011).

Other examples of clock related timing components that lend their timing capabilities to the GLINT concept may include, for example, the Honeywell chipscale atomic clock, as well as the Symmetricon chipscale atomic clock (CSAC). In addition, the JHU/APL advanced timing circuit may be a candidate for the GLINT system. The JHU/APL circuit is a timing board developed by John Hopkins University/Advanced Physics Laboratory which has achieved pico-second-level accuracy for photon arrival time. The circuitry incorporates ASIC-based timing electronics.

Current GLINT processing using FFTFIT has achieved $1/100^{th}$ of a bin uncertainty ranges. For enhanced performance, GLINT would require planned improvements to data processing techniques and significantly enhanced γ-ray detector timing capabilities to achieve binning of less than 100 μs, such as 1 μs or less burst TDOA uncertainties would be achievable.

Figure 8:
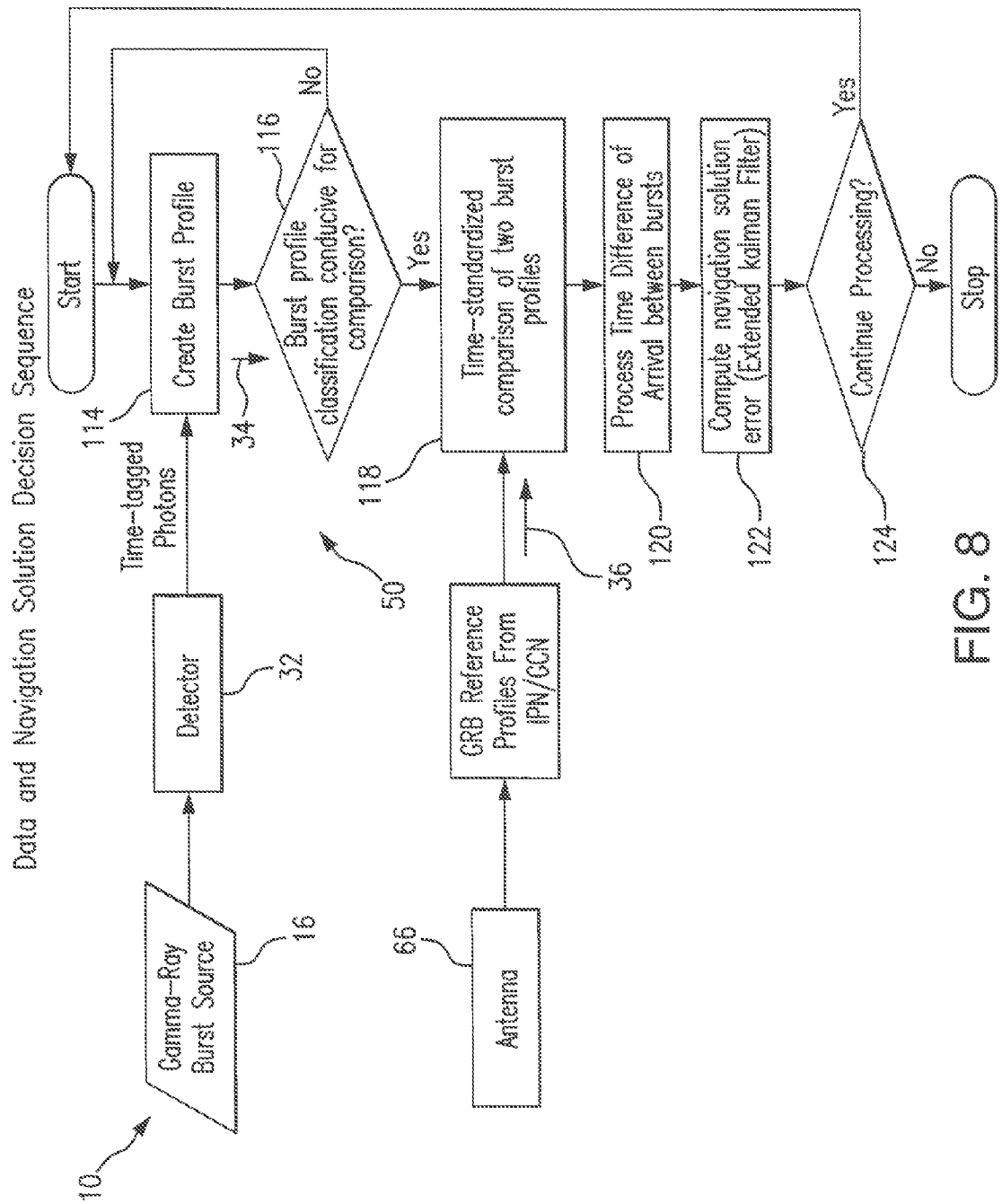
FIG. 8 is a flowchart diagram of the GLINT process representing data and navigation solution decision sequence.

Summarizing the concept presented in FIGS. 4-5 and 6A-6B, the GLINT system uses a data navigation solution decision sequence presented in FIG. 8 which is supported by the configuration of the Computer System 80 at the remote spacecraft 12 or at the central control station, such as, for example, the Earth Ground Station.

The process of the data navigation solution decision sequence starts by detecting the gamma-ray burst event 16 at the detector 32 on-board of the remote spacecraft 12 which outputs the time-tagged photons to the unit 114 "Create Burst Profile".

The result of the processing in the unit 114 in the form of burst profile 34 is processed in the logical block 116 "Burst Profile Classification Conducive for Comparison?". If the burst profile 34 is not conducive for comparison, the logic loops back to the START of the flow chart. If however in logical block 116, it is determined that the burst profile 34 classification is conducive for comparison, the logic flows to block 118 "Time-Standardized Comparison of Two Burst Profiles" where the burst profile 34 received from block 116 is time-aligned and compared to the GRB reference profile 36 received either directly from the base station 14 or from IPN/GCN system 18.

Upon processing of two burst profiles 34 and 36, e.g., detected at the remote spacecraft 12 and the base station 14, in block 118, the flow passes to block 120 "Process Time Difference of Arrival Between Bursts" where the TDOA is computed in accordance with the principles described supra.

Upon completion of the processing of the time difference of arrival between bursts in block 120, the logic flows to block 122 "Compute Navigation Solution Error (Extended Kalman Filter)" where the navigation solution error is computed by applying the Kalman filter to the results of computation as will be detailed further herein.

From block 122, the logic flows to logical block 124 "Continue Processing?" where the decision is made whether the processing is to be continued. If the processing is completed, the process ends. If however in logical block 124 further processing is needed, the logic flows from block 124 to the START of the procedure.

Glint Navigation Algorithms

In order to evaluate the performance of the designed GLINT concept, two navigation algorithm methods were devised that use GRB TDOA measurements as input. The first approach produces a single scalar value that is computed using the TDOA measurement to formulate range between vehicles along the line of sight to the GRB, as in Eq. (1). The second approach formulates a full three-axis relative position measurement based upon Eq. (1), and is expected to provide an improved approach over the scalar method.

The primary function of the GLINT navigation system is to determine the accurate, full, three-dimensional position, expressed as $$r = r_{SC} = \{r_x, r_y, r_z\}^T, \text{ and} \qquad \text{Eq. (2)}$$

velocity of the remote spacecraft. These navigation states can be with respect to an inertial origin or expressed relative to a base, or reference, spacecraft located at $r_{Base}$. Specifically, the three-dimensional position $r_{sc}$ of the vehicle of interest is relative to the origin of an inertial reference frame, the three-dimensional position $r_{base}$ of the reference station is also relative to the origin of an inertial reference frame, $\Delta r$ is the relative position of the vehicle of interest with respect to the reference station, and T denotes the vector transpose. The position separation, or difference, $\Delta r$, between these vehicles is computed by applying Eq. (2)

$$\Delta r = r_2 - r_1 = r_{SC} - r_{Base} \qquad \text{Eq. (2)}$$

The diagram in FIG. 9 shows this relationship and explains how the time offset relates to the position separation expressed in Eq. (2). The primary measurement of the GLINT navigation system is the time offset Δt of the GRB arrival between two spatially separated spacecraft 12 and 14. The time offset, Δt, is computed as accurately as possible by any of the GRB comparison methods described above.

Figure 10:
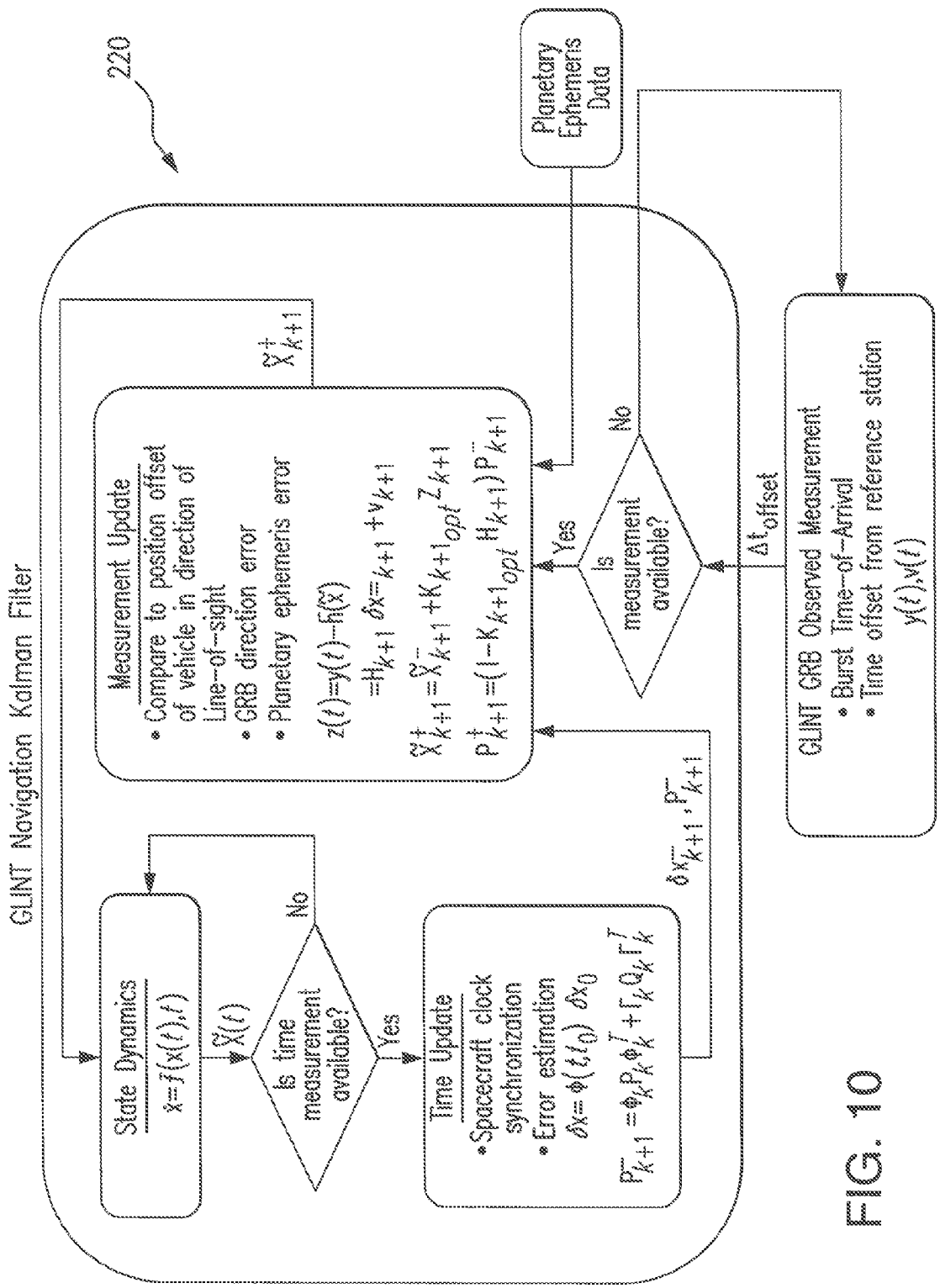
FIG. 10 is a diagram representing the GLINT navigation Kalman filter.

To provide the optimal GLINT data processing, the observations of the GRB time offsets can be processed with an extended Kalman filter (EKF) 220 shown in FIG. 10 and described in Gelb, A. Ed., *Applied Optimal Estimation*, The M.I.T. Press, Cambridge, Mass. 1974. The GLINT EKF (Extended Kalman Filter) uses the high fidelity orbit dynamics of a vehicle, processes measurements, and updates the error solution and covariances. Between burst measurements, the motion of the vehicles is incrementally propagated forward. The EKF designed for GLINT uses the filter states of the error of position and velocity of the remote vehicle. Error estimates of spacecraft clock synchronization, GRB direction, and planetary ephemeris could be included as state variables in future implementations of the GLINT EKF.

The navigation states of the GLINT navigation system and EKF follow the methods previously developed for the XNAV system. The EKF states, x, are vehicle position, r, and velocity, v, as $x = [rv]^T$. The non-linear spacecraft orbital dynamics can be expressed as $$\dot{x}(t) = \bar{f}(x(t)t) + \eta(t) \qquad \text{Eq. (3)}$$

In Eq. (3) $\bar{f}$ is the non-linear state vector function, as $\bar{f}(x(t),t) = [\dot{r}\dot{v}]^T = [va]^T$ where a is the vehicle acceleration.

The second term in Eq. (3), η(t), is the noise vector associated with the unmodeled state dynamics. Using the dynamic models of acceleration of the spacecraft, including the primary orbiting body gravitational effects and higher order disturbances, the full vehicle state dynamics can be expressed. (Sheikh, S. I., et al., "Recursive Estimation of Spacecraft Position and Velocity Using X-ray Pulsar Time of Arrival Measurements," *Navigation: Journal of the Institute of Navigation*, Vol. 53, No. 3, 2006, pp. 149-166).

The GLINT Kalman filter is an extended Kalman filter due to the non-linear dynamics of the orbiting spacecraft. The states of the GLINT EKF are the errors of the state vector. These error-states, δx, can be represented based upon the true states, x, and the estimated states, $\tilde{x}$, as, $$x = \tilde{x} + \delta x \qquad \text{Eq. (4)}$$

Following the past navigation filter derivations, the full GLINT EKF error state dynamics and state covariances for the remote spacecraft can be propagated in time. The EKF dynamics and processing flow is shown in FIG. 10.

The GLINT observations, y, follow a relationship with respect to the states as $$y(t) = \bar{h}(x(t), t) + v(t) \qquad \text{Eq. (5)}$$

In this expression, $\bar{h}$ is a non-linear function of the state vector, and perhaps time. The measurement noise associated with each observation is represented as v.

In order to assemble the GLINT observation in terms of the error states of the EKF, the measurement difference, z, is computed as $$z(t) = y(t) - \bar{h}(\tilde{x}) = \frac{\partial \bar{h}(\tilde{x})}{\partial x} \delta x + v(t) = H(\tilde{x}) \delta x + v(t) \qquad \text{Eq. (6)}$$

This measurement difference, z(t), is referred to as the measurement residual, and H is the measurement matrix of measurement partial derivatives with respect to the states. (Gelb, A. Ed., *Applied Optimal Estimation*, The M.I.T. Press, Cambridge, Mass. 1974).

Based upon the diagram of FIG. 9, a scalar measurement implementation follows from the range calculation using the observed GRB time offset as, $$z(t) = c\Delta t - \hat{n}^T \Delta r = [\hat{n}^T 0_{1\times 3}]\delta x + v(t) \quad \text{Eq. (7)}$$

This scalar method is straightforward to calculate from the GRB time offset, $\Delta t$ and the estimated remote spacecraft position and known base spacecraft position, $\Delta r$. Any discrepancy computed in z is related to the errors in the remote spacecraft position and velocity using Eq. (7). The range measurement is a singular scalar value and can only adjust a portion of the estimated vehicle position and velocity with each GRB observation.

A second measurement approach uses a full three-dimensional approach in order to correctly adjust all three axes of position and velocity with each GRB observation. This vector measurement method is devised as, $$z(t) = (c\Delta t)\hat{n} - (\hat{n}^T \Delta r)\hat{n} = [(\hat{n}\cdot\hat{i})\hat{n}^T 0_{1\times 3}]; [(\hat{n}\cdot\hat{j})\hat{n}^T 0_{1\times 3}];$$
$$[(\hat{n}\cdot\hat{k})\hat{n}^T 0_{1\times 3}]\delta x + v(t) \quad \text{Eq. (8)}$$

where {i, j, k} are the unit axis directions for the spacecraft's coordinate system.

Both the scalar and vector methods for GLINT EKF measurements were evaluated. It was determined that the vector method provided improved processing and performance with its multi-axis observation per measurement, although the scalar method is equally applicable to this measurement method.

Glint Navigation Simulation and Performance

A simulation, written in MATLAB, was developed to evaluate the performance of the GLINT navigation algorithms. The simulation propagates a truth model of a spacecraft on an interplanetary trajectory, and compares a similar trajectory initially injected with position and velocity errors that is continually corrected by GLINT measurements. The comparison of the truth trajectory with the corrected simulation provides an evaluation of EKF performance.

To evaluate the benefits of the GLINT navigation system, comparisons to DSN navigation solutions were produced. This approach is similar to past research on the evaluation of navigation using X-ray pulsars. A simulated heliocentric trajectory was chosen at 100 days prior to a rendezvous at Mars, which was implemented based upon available trajectory data for the Mars Science Laboratory (MSL) vehicle. The Earth to Mars interplanetary trajectory simulation utilizes a numerical orbit propagator with 1000-s time steps. All third-body effects are considered, including eight planets, one dwarf planet, Earth's Moon, and solar radiation pressure acting on the filter states. Initial errors in each axis for position and velocity of 100 m and 0.1 m/s, respectively, were used to simulate a significant drift from truth of a navigation solution. The EKF's initial covariance estimates were selected as $\sigma_{pos_0}=500$ m and $\sigma_{vel_0}=0.5$ m/s, primarily to support the large initial errors present within the simulations.

Simulated measurements were created utilizing the truth trajectory data while incorporating the appropriate system measurement model and its expected uncertainty. The measurement noise was varied for each measurement using its one-sigma uncertainty value and a multiplicative factor based upon a random number generator.

The simulation's EKF measurement options included three primary test scenarios: i) DSN's ΔDOR only; ii) GLINT vector only; and iii) GLINT vector+DSN's range-only. The various measurement uncertainty and frequency were varied for different sets of simulation runs.

DSN ΔDOR (differential one-way ranging) measurement uncertainty was selected to be the stated 1 nrad capability of the system, processed once per day. DSN range-only observations used a radial-only measurement accuracy of 1 m with observation frequency varied between once per day to once per 30 days. Uncertainties of the GLINT vector measurements were modeled based upon a burst TDOA performance from 10.0 µs, with observation frequencies between one and four every two days. Only those measurements that passed an innovations test were processed in the EKF.

Figure 11:
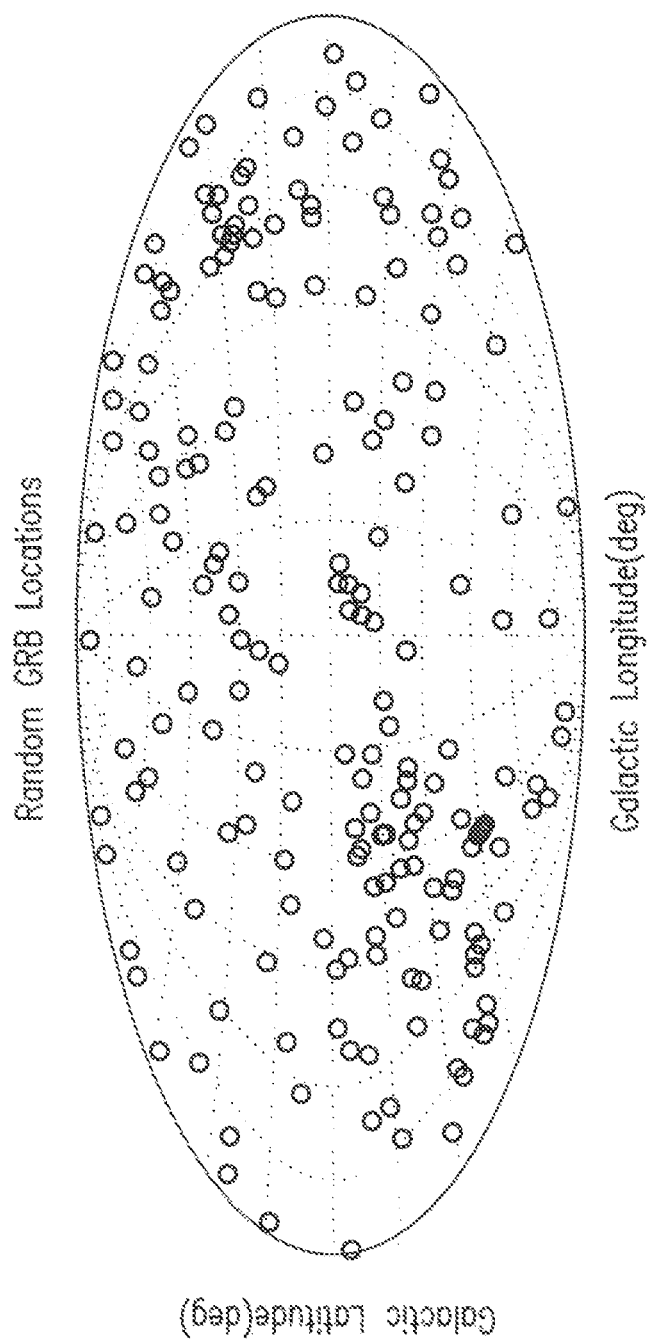
FIG. 11 is an example distribution of simulated GRBs used for navigation.

GRB measurements were simulated using random sky locations for the bursts. This randomness of the location is accurate based upon past GRB all-sky observations. The plot in FIG. 11 shows the locations of these generated bursts for an example simulation, along the celestial sphere.

A Monte-Carlo analysis was performed, with 15 simulated runs with different random number seeds for each run used in generating the simulated navigation system measurements. The results of the full Monte-Carlo output were then averaged to produce a resulting performance value for that set of runs.

Figure 12:
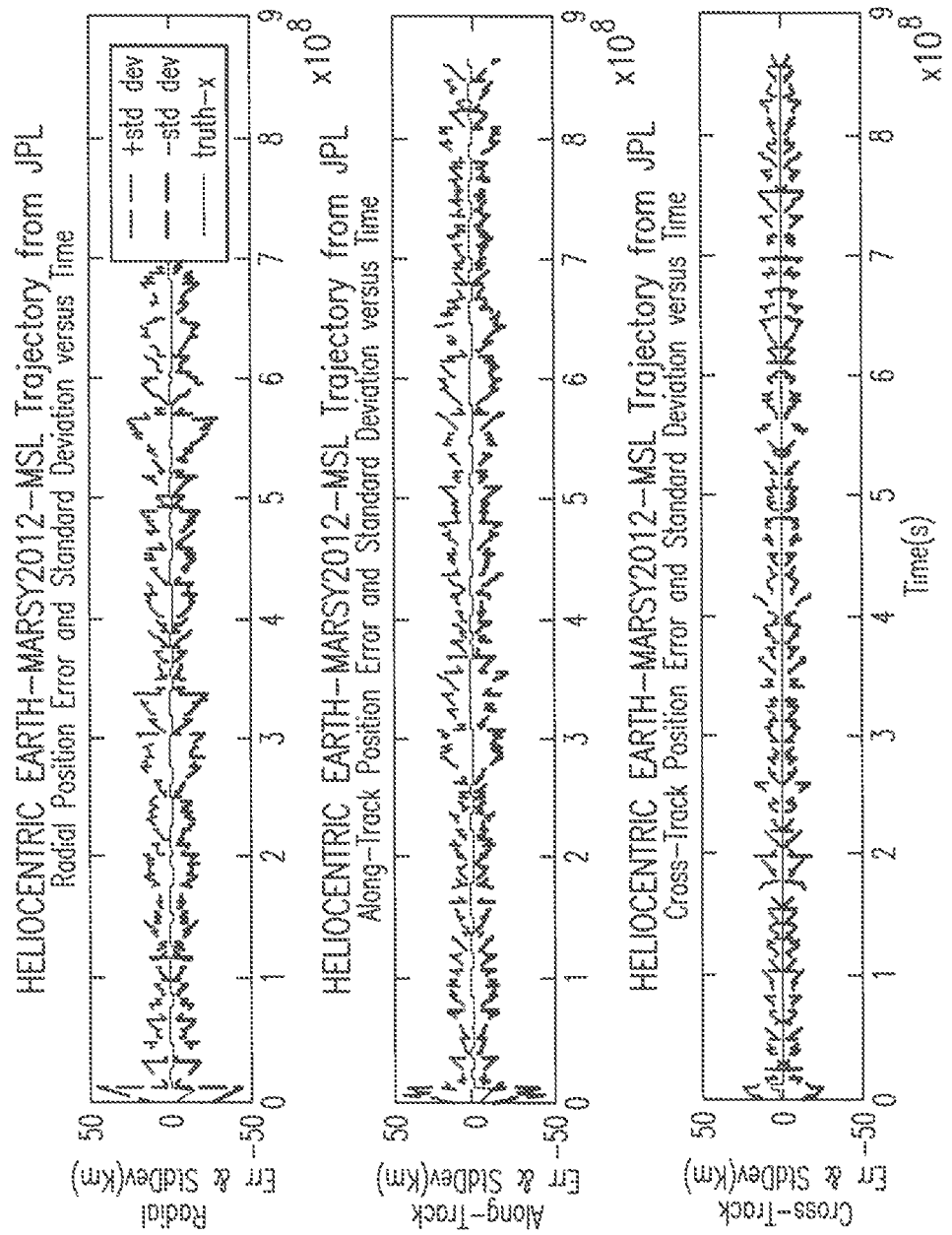
FIG. 12 represents EKF (Extended Kalman Filter) covariance envelope plots for simulated Mars rendezvous.
Figure 13A:
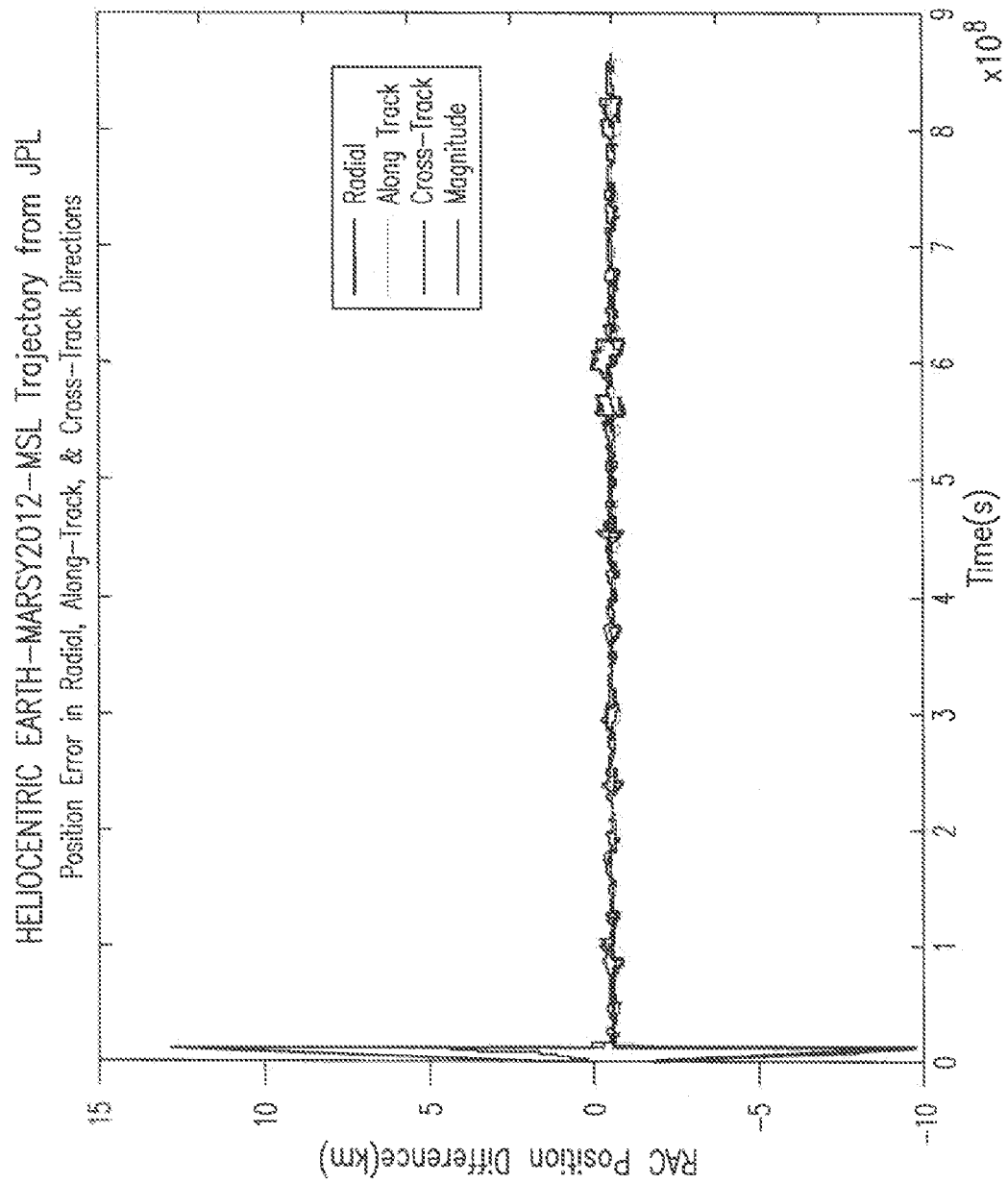
FIGS. 13A-13B are diagrams representing position errors in Radial Along-Track & Cross-Track Directions over the duration (3 days) of the example simulation.
Figure 13B:
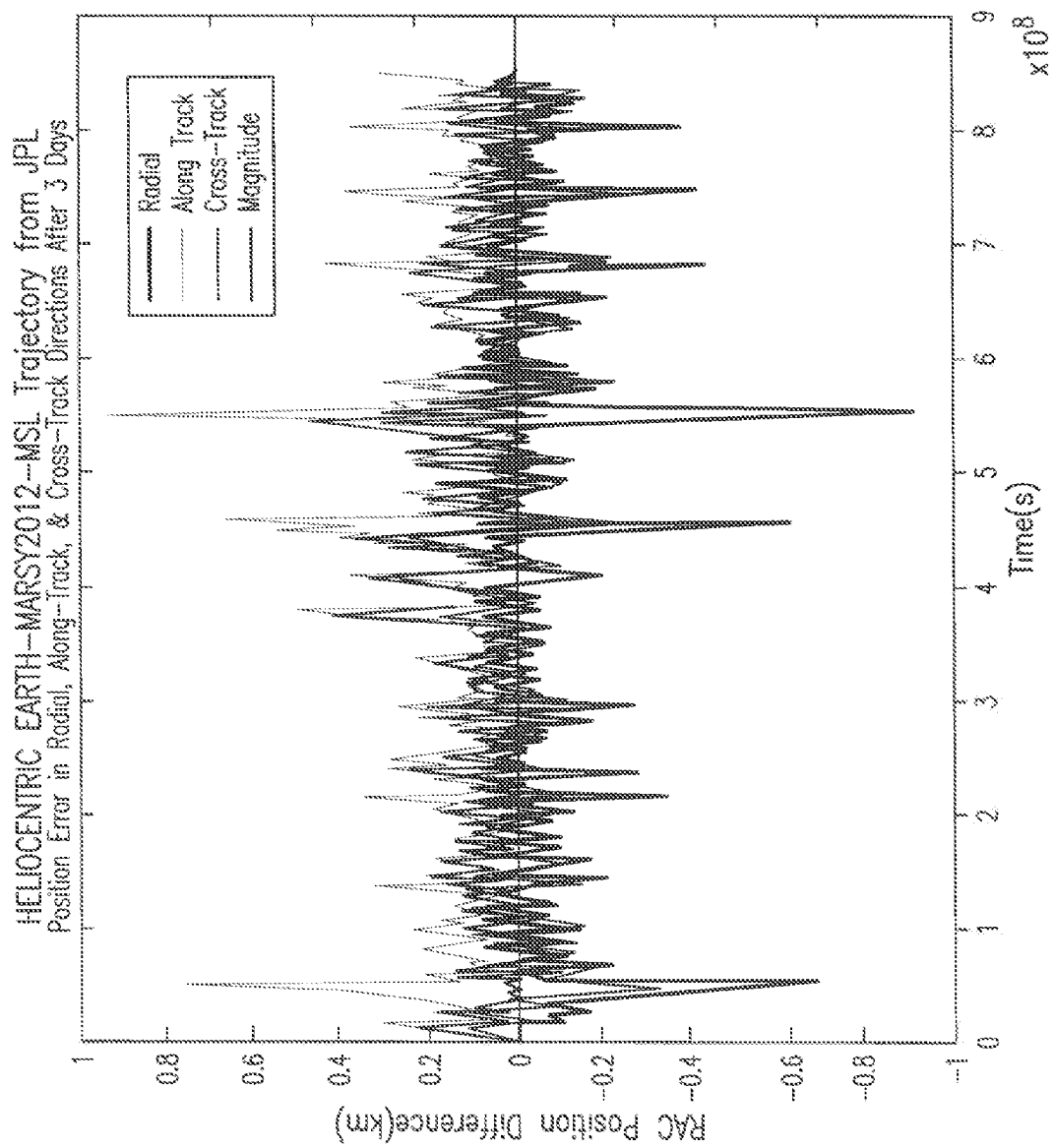

An example simulation output of the covariance and state error plots is shown in FIG. 12, which provides a one-sigma covariance boundary of each position axis as well as truth-simulation error throughout the run. The three dimensional inertial {x,y,z} position axes plots have been converted to Earth-to-remote-spacecraft radial, along-track, and cross-track error plots. As is shown in FIGS. 13A-13B, starting with the stated initial errors in position, errors grow quickly over time until measurements begin to be processed, where eventually, with sufficient measurements, the initial position errors are essentially removed. The plot in FIG. 13A shows the entire run including the initial large input error, whereas the plot in FIG. 13B shows the error growth after three days.

The averaged results from the Monte-Carlo simulation runs are provided in Tables 2-4.

TABLE 2

EKF Example Simulation Performance For DSN and GLINT.

| EKF | Error Type | After 3 Days | | | After 30 Days | | |
|---|---|---|---|---|---|---|---|
| | | R | A | C | R | A | C |
| DSN ΔDOR | Pos RMS error (m) | 69 | 978 | 1039 | 76 | 898 | 1179 |
| | Cov Mean (m) | 2925 | 3041 | 2946 | 2958 | 3049 | 2962 |
| GLINT (2 per day) Vector (10 µs) | Pos RMS Error (m) | 1585 | 1278 | 875 | 1575 | 1339 | 922 |
| | Cov Mean (m) | 8458 | 8336 | 6436 | 8020 | 8543 | 6415 |
| GLINT (2 per day) Vector (1 µs) | Pos RMS Error (m) | 993 | 883 | 721 | 984 | 876 | 677 |
| | Cov Mean (m) | 873 | 8088 | 5926 | 8562 | 7803 | 5842 |

The first rows of the EKF simulation in Table 2 show results based upon DSN's 1 nrad ΔDOR measurement accuracy. The errors in this case on a 100-day run are very low on the radial component, but larger along-track and cross-track errors remain (following the general rule of 1 km per AU for DSN accuracy). Covariance estimates for DSN ΔDOR observations are fairly low, but the values shown in Table 2 are highly driven by process noise, dependent on the dynamics model validity.

The other two rows in Table 2 represent a vector GLINT measurement with uncertainty of 10 µs and 1 µs, respectively. These values were chosen to represent a one and two order of magnitude improvement over what is achievable presently. Although the 1 μs TDOA uncertainty shows improved results, both these sets of runs show that the GLINT vector measurement method is capable of approaching DSN's accuracy. Moreover, because the GRBs are geometrically separated and detectors are capable of making measurements along the lines of sight to each of the sources, the DSN-related issue of errors building up n the along-track and cross-track axes does not exist for GLINT. The GLINT covariance estimates are much larger, which was an expected result, as this method does not make continuous measurements in all three axes.

TABLE 3

EKF simulation Results for GLINT + DSN Measurements.

| EKF | Error Type | After 3 Days | | | After 30 Days | | |
|---|---|---|---|---|---|---|---|
| | | R | A | C | R | A | C |
| GLINT (10 μs, 2 per day) + DSN Range (every 30 days) | Pos RMS error (m) | 7628 | 7477 | 5764 | 7281 | 7501 | 5780 |
| | Cov Mean (m) | 11926 | 12366 | 8992 | 11801 | 12713 | 8941 |
| GLINT (10 μs, 2 per day) + DSN Range (every 10 days) | Pos RMS Error (m) | 6576 | 7799 | 5496 | 6735 | 7795 | 5607 |
| | Cov Mean (m) | 10942 | 11396 | 8607 | 10861 | 10576 | 8684 |
| GLINT (1 μs, 2 per day) + DSN Range (every 30 days) | Pos RMS Error (m) | 1124 | 1178 | 976 | 944 | 1229 | 1030 |
| | Cov Mean (m) | 8494 | 8585 | 6443 | 8097 | 8460 | 6724 |
| GLINT (1 μs, 2 per day) + DSN Range (every 10 days) | Pos RMS Error (m) | 1114 | 1103 | 875 | 1229 | 1214 | 893 |
| | Cov Mean (m) | 7005 | 7538 | 6256 | 7572 | 7708 | 6207 |

Table 3 provides simulation results in which GLINT would augment DSN operation, lending itself to its full operational concept, so as not to compete with DSN, but rather be a supplemental improvement. DSN range-only measurements taken once every thirty days augmented with GLINT measurements provide for reduced operational costs (ΔDOR measurement which can require more complex operations). GLINT measurement accuracies in the first two rows of Table 3 were set at 10 μs. Although errors in all three axes remain larger than with ΔDOR alone, reducing DSN range measurements from 10 to 30 days shows no significant loss in accuracy.

The third and fourth rows represent an increased GLINT accuracy of 1 μs. In this case, while radial errors are larger compared to ΔDOR levels, along-track and cross-track errors are driven down to the order of ΔDOR uncertainties. The covariance estimate is large due to the fewer number of measurements. Based on the spacecraft EKF simulation results, capabilities of reducing along-track and cross-track errors for future DSN missions are anticipated. GLINT measurement accuracies at the 1 μs level will require implementation of planned improvements to detector photon timing and data binning techniques.

With current data bin sizes on the order of tens of milliseconds and TDOA uncertainties determined to be 1/100$^{th}$ of a bin, if future γ-ray detector bin sizes of less than 1 μs are achieved then TDOA measurement uncertainties may be several orders of magnitude improved over present capabilities. Therefore, Table 4 represents a simulation in which GLINT augments DSN range-only operation with a highly-optimistic measurement uncertainty for GLINT of 0.1 μs.

TABLE 4

EKF Simulation Results For High Accuracy GLINT + DSN Measurements.

| EKF | Error Type | After 3 Days | | | After 30 Days | | |
|---|---|---|---|---|---|---|---|
| | | R | A | C | R | A | C |
| GLINT Vector only (0.1 μs, 2 per day) | Pos RMS error (m) | 135 | 136 | 106 | 128 | 137 | 108 |
| | Cov Mean (m) | 8831 | 8455 | 6500 | 8742 | 8694 | 6475 |
| GLINT (0.1 μs, 2 per day) + DSN Range (every 30 days) | Pos RMS Error (m) | 134 | 138 | 101 | 129 | 140 | 102 |
| | Cov Mean (m) | 8909 | 8412 | 6498 | 8838 | 8642 | 6457 |
| GLINT (0.1 μs, 2 per day) + DSN Range (every 1 day) | Pos RMS Error (m) | 38 | 149 | 113 | 38 | 147 | 112 |
| | Cov Mean (m) | 2556 | 5334 | 4123 | 2562 | 5602 | 4018 |

Results in this case are very comparable to DSN overall. As shown, if DSN range measurements are taken once every ten days augmented with GLINT, providing for reduced operational costs, this approach alone yields very close measurements to DSN ΔDOR capabilities. Future investigations will focus on how to achieve GRB TDOA measurements to these accuracies.

The results of this analysis show that:
 a) As anticipated, successively finer time resolution of the GRB TDOAs improved the GLINT-based solutions.
 b) GLINT-based solutions were capable of reducing all axes of position and velocity errors, whereas DSN measurements primarily reduced the radial direction error values.
 c) The DSN range-only solutions could be reduced from once per day to once per 30 days without significant degradation of the navigation solution when augmented with GLINT measurements.
 d) The GLINT observations could achieve sub-km errors if TDOA accuracies of less than 1 μs can be achieved.

As presented in FIGS. 16A-16B and 17-18, two potential data transmission and processing paths are available for the GLINT system. In one approach, the processing of the TDOA between the acquired light curve burst profiles, computation of the navigation solution, including cross correlation and filtering techniques, as well as navigation updates, would be performed on-board the GLINT-equipped spacecraft 12. The data telemetry path in this embodiment proceeds up to the remote spacecraft, which autonomously computes and updates its own navigation solutions.

In the alternative approach, the light curve burst profiles obtained by each observing spacecraft, i.e. the base station 12 and the remote spacecraft 14, would be telemetered down to a central ground- or space-based processing station. The cross correlation between light curve burst profiles and navigation solutions refinement would be performed at the central control station. The updated navigation solutions based on the relative distances would then be maintained at the central control station and future control maneuvers would be planned accordingly.

Figure 16A:
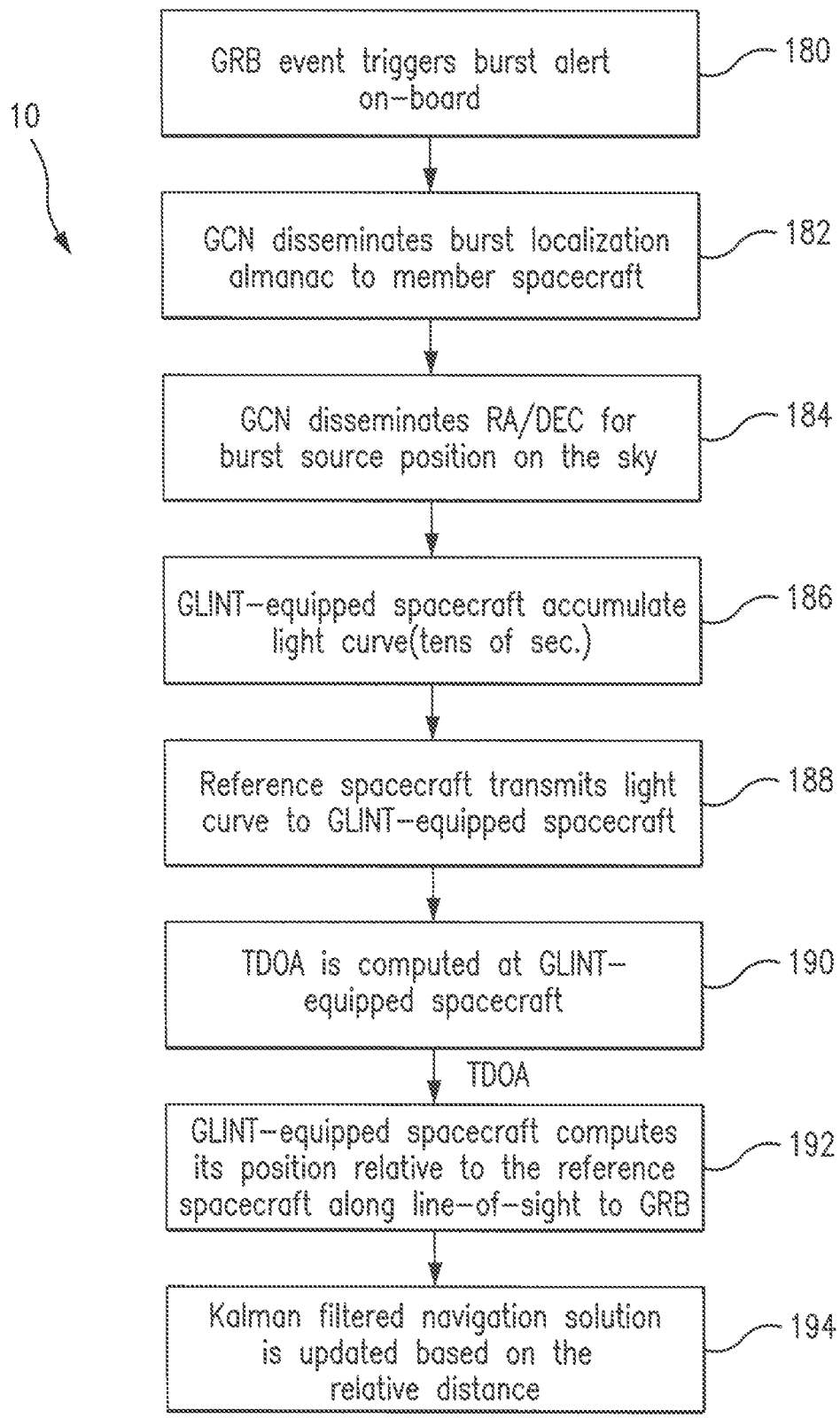
FIGS. 16A and 16B are schematic diagrams representing two alternative paths in GLINT navigation architecture, including the on-board processing, (FIG. 16A), and ground processing (FIG. 16B)

Referring to FIG. 16A and returning to FIG. 5, in one embodiment, the processing of light curve profiles and the navigation solution computation are performed on-board the spacecraft of interest 12 which permits completely autonomous navigation of the spacecraft.

In accordance with the on-board processing TDOA and navigation solution forming, the process starts with the step 180 in which the GRB event triggers burst alert on-board spacecraft 12. The preliminary localization of the gamma-ray burst source is transmitted to GCN from the spacecraft. From block 180 the process flows to step 182 where GCN disseminates the burst localization almanac to member spacecraft.

In the subsequent step 184, the GCN disseminates the RA/DEC (Right Ascension and Declination) for the burst source position on the sky and a well defined fiducial point in the burst light curve at a solar system reference point and time.

In a subsequent step 186, the GLINT-equipped spacecraft accumulates a light curve 34 for the duration of the burst using fine resolution time-tagged photon arrival times.

In the following step 188, the reference spacecraft 14 transmits the light curve 36 accumulated at the reference spacecraft for the target burst to the on-board GLINT system via a GLINT system transmission antenna 66.

In a subsequent step 190, upon receipt of the reference light curve profile 36, the GLINT-equipped spacecraft 12 computes, by the process supported by the GLINT software presented in FIGS. 4-5, 6A, 8, and 14-15, and the FFTFIT, the TDOA between the spacecraft's internal clock and the arrival time projected to the reference frame using either the Maximum Burst Peak Alignment routine 108, MATLAB xcorr processing 110, FFTFIT 112, or alternatively, Dynamic Time Warping, depending on the decision made in the logical block 107 shown in FIG. 6A.

Given the GRB localization, the computer 80 of the spacecraft 12 computes its position relative to the solar system reference point in the step 192 based on the TDOA and Eqs. (1) and (2) previously presented.

Further in the subsequent step 194, the Kalman filtered navigation solution based on the measured relative distance is updated, and the data are provided to the Vehicle Control Unit 62 (shown in FIG. 4) for navigation purposes.

Figure 16B:
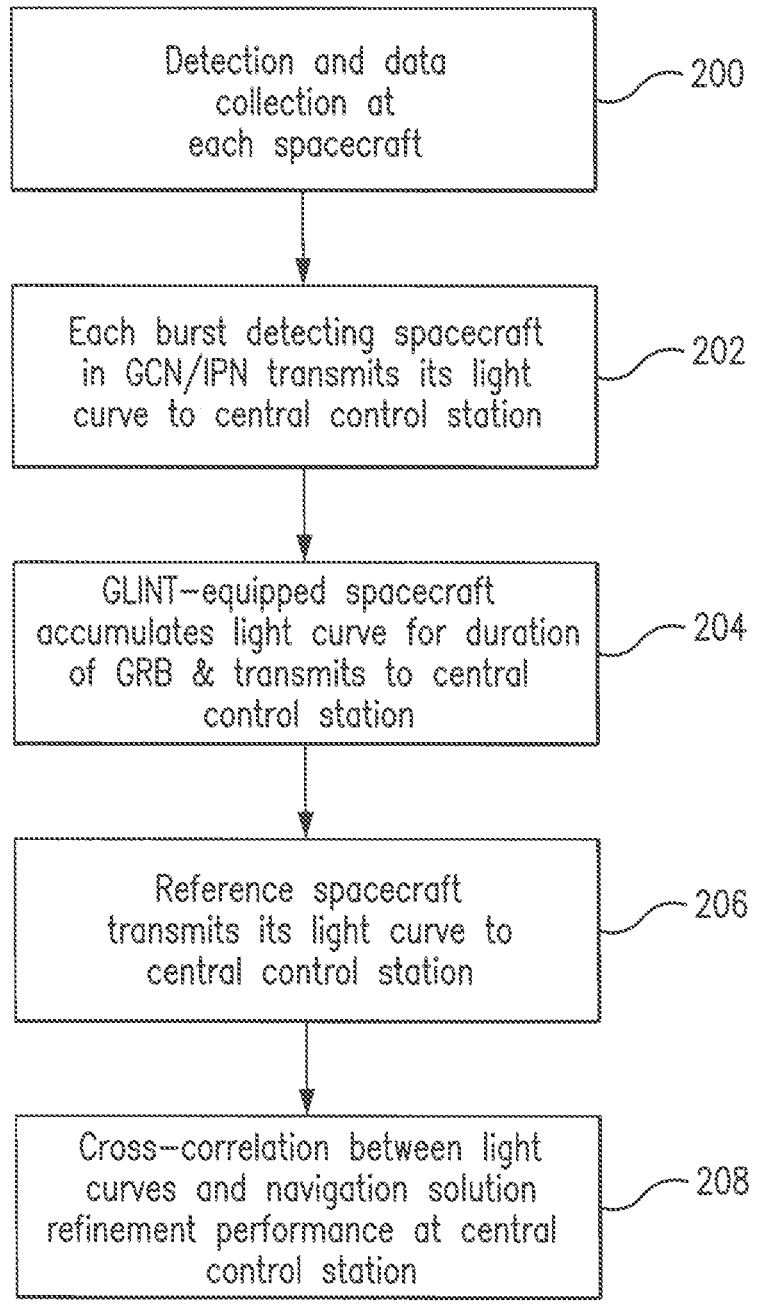

Referring to FIG. 16B and returning to FIG. 5, in the alternative embodiment, the processing of the TDOA and navigation solution formation is performed at the Earth Ground Station 18. In this embodiment the process starts in block 200 where the GRB event triggers burst alert on-board spacecraft 12 and reference spacecraft 14 upon which the gamma-ray event is detected and data are collected for the target burst at each spacecraft 12, 14.

In the subsequent step 202, each burst-detecting spacecraft 12, 14 in the GCN/IPN system transmits its respective light curve 34, 36, respectively, to a central control station, for example, the Earth Ground Station 18.

In step 204, the GLINT-equipped spacecraft 12 accumulates a light curve 34 for the duration of the burst (tens of seconds) using fine-resolution time-tagged photon arrival times and transmits to the central ground station 18.

At the same time, the reference spacecraft 14 transmits its own light curve 36 for the target burst to the Earth Ground Station 18.

In the following step 208, a cross-correlation between the light curves 34, 36 is performed to determine the Δt offset between the light curves, and navigation solution refinement is performed at the Ground Station.

Figure 17:
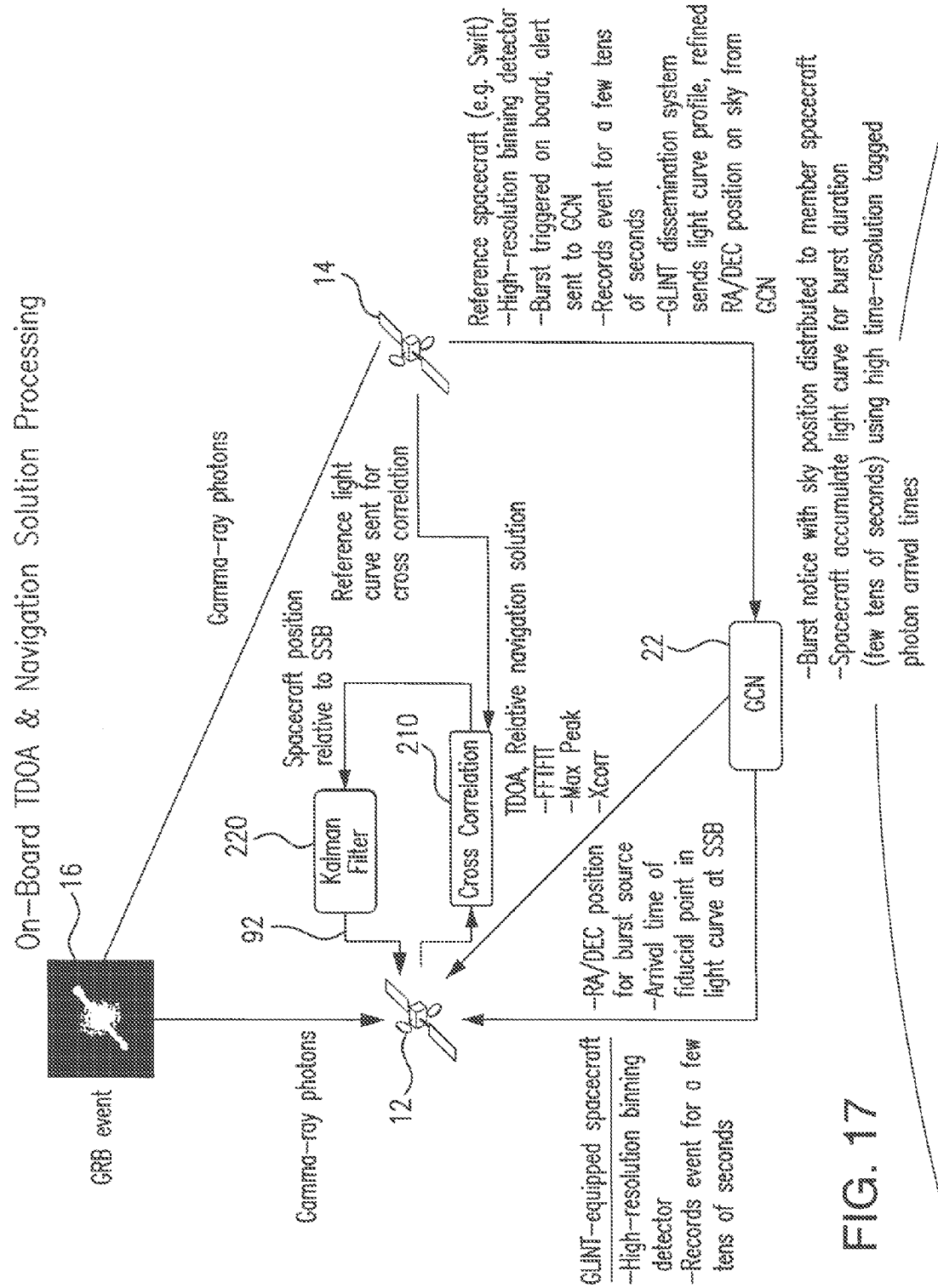
FIG. 17 is a detailed diagram of the on-board path for the TDOA and navigation solution computing.

The on-board TDOA and navigation solution processing is detailed in FIG. 17. As presented, the gamma-ray photons from the GRB event 16 are detected at the GLINT equipped spacecraft 12 and the referenced spacecraft 14 using high-resolution binning detectors mounted on the GLINT spacecraft and the reference spacecraft. The GRB event triggers burst alert on-board spacecraft 12 and 14, and alerts are sent to the GCN system 22.

Both spacecraft, the GLINT equipped spacecraft 12 and base station 14 record the event for a few seconds, e.g., the duration of the gamma-ray burst event. GLINT dissemination system sends light curve profile and refined RA/DEC position on sky from the GCN system 22 upon receipt of the GRB localization from the GLINT-equipped spacecraft. The DCN system distributes the burst notice with the position to member spacecraft.

The reference spacecraft 14, or the GCN system 22, also transmits the recorded light curve 36 to the GLINT-equipped spacecraft 12 so that the cross correlation processing unit 210 calculates the TDOA value by applying either the Max Peak Alignment routine 108, xcorr function routine 110, FFTFIT routine 112, or dynamic time warping technique.

Based on the computed TDOA, a relative navigation solution is calculated. The Kalman filter 220, detailed in FIG. 10, is applied to the navigation solution which is continuously refined and updated in view of the computed location and velocity of the deep space spacecraft. The refined navigation solution 92 is provided to the processing system of the GLINT-equipped spacecraft 12 for controlling the vehicle control system accordingly.

Figure 18:
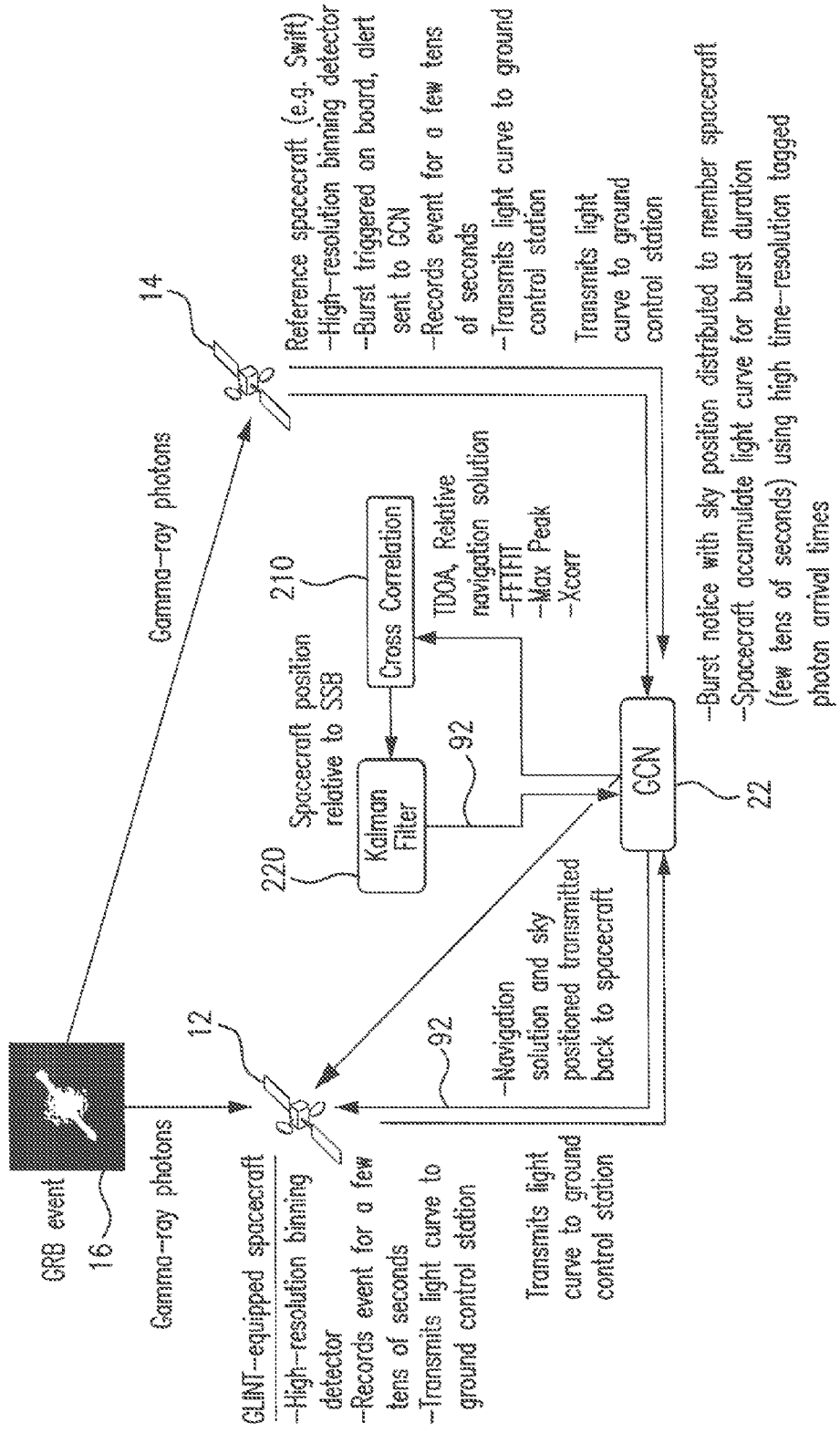
FIG. 18 is a detailed diagram of the ground path for the TDOA and navigation solution computing.

Referring to FIG. 18 which represents the on-ground TDOA and navigation solution processing, upon detecting the GRB event, the GLINT equipped spacecraft 12 and the reference spacecraft 14 transmit light curve to the Ground control station, such as GCN system 22, which, in its turn, distributes the burst notice with the GRB's initial RA/DEC sky position to GCN member spacecraft, and subsequently refines the RA/DEC position for the burst source based upon additional observation data from GCN member spacecraft.

The GCN system 22 also calculates the arrival time of a fiducial point in the light curve at the reference point. Upon receiving the light curves from the GLINT-equipped spacecraft and reference spacecraft, the GCN system 22 performs the computation of the TDOA and relative navigation solution in the cross correlation unit provided thereat. The system applies the Kalman filter 220 to the navigation solution. The Kalman filter supplies the refined navigation solution 92 to the GCN system 22, which in its turn, transmits the refined navigation solution to the GLINT-equipped spacecraft 12 for activating the Vehicle Control Unit.

Referring to FIG. 19, the GLINT-equipped spacecraft 12 is envisioned with the hybrid X-ray and gamma-ray detector 32 which is capable of detecting both X-photons and gamma-photons for the duration of the burst event.

Although a number of different gamma-ray detector implementations are contemplated in the GLINT system, as an example only, but not to limit the scope of the invention to the specific design presented herein, the detector 32 may include a collimator/coded aperture mask 72 provided in combination with X-ray detectors 74 which are oriented in numerous directions to face X-ray photons 230 incident on the collimator/coded aperture mask 72 from different directions.

Scintillators 76 provided to detect gamma-photons are formed from materials that exhibit scintillation, e.g. the property of luminescence, when excited by the radiation. High-Z materials, e.g. inorganic crystals, may be considered best suited for the detection of gamma-rays. When a gamma-ray interacts with the matter of the scintillator, it causes either a photoelectric effect, Compton scattering, or pair production. The photon is completely absorbed in photoelectric effect and pair production, while only partial energy is deposited in any given Compton scattering. High-Z material favors the pair production and Compton scattering, enabling the detection of the full energy of gamma-ray.

The photon timing board 78 is positioned in proximity to the scintillators 76, and functions as a high speed high linearity A/D acquisition board that is aimed at photon-timing measurements. The principles of operation and design of the photon timing board are known to those skilled in the art, and are not detailed herein.

The high-precision system clock 64, for example, an atomic clock, may be a part of the detector sub-system 32 in question. The atomic clock is coupled to the photon timing board to support the time-tagging of the photons detecting events by the detector 32.

At the exit of the detector 32, photon data (including time-tagged photons and energy) is output and is subject to signal processing and navigation algorithm as presented supra. The results of calculations may be transmitted to the DSN system for the purposes of source almanac editing and navigation information sharing.

The results of the GLINT concept analysis establish the feasibility and innovation of a novel relative navigation technique using GRB TDOA measurements. Specifically, this GLINT evaluation demonstrated the ability to use existing GRB TDOA data to compute spacecraft range measurements that match measured spacecraft geometries.

Using an interplanetary navigation simulation, it was shown that anticipated GLINT performance could achieve positional accuracies on the order of current DSN capabilities. Additionally, the augmentation of GLINT measurements allows DSN contact frequency with spacecraft to be reduced, freeing up valuable NASA resources for additional exploration missions.

GLINT can be very complementary to DSN, as it is likely all future deep space missions will continue to be equipped with on-board γ-ray detectors. While the current infrastructures of the IPN and GCN and their supporting spacecraft provide for an existing system for observing and communicating GRB localizations for future GLINT implementation, future improvements to photon processing capabilities would facilitate viable full implementation of this concept and could vastly enhance deep space autonomous navigation capabilities.

GLINT system and method are also envisioned in a number of other applications, including, for example, terrestrial applications, where the known position of the GLINT-equipped vehicle or monitor is utilized in the process of locating a gamma-ray event, such as, for example, high-energy radiation or nuclear detonations.

GLINT can provide effective support in the detection and localization of terrestrial high energy radiation events or nuclear armament detonations. With its precise timing capabilities, the inverse of the celestial GRB processing GLINT methodology can be incorporated into determining the precise location of any terrestrial high-energy photon gamma-ray source triggers (including nuclear detonations) both artificially created and potentially naturally occurring in Earth environments. This would be accomplished by inverting the GLINT procedure described supra to determine the location of a gamma-ray event, by using trilateration techniques from cooperating vehicles or monitor sites equipped with GLINT detectors and their known locations. The process is applicable for any terrestrial or other planetary body observation system, either with land vehicles or fixed monitor stations, or orbiting spacecraft, each containing a GLINT detector and processing system.

In order to determine the location of a terrestrial (or other planetary body) gamma-ray-source, each GLINT-equipped detection vehicle would have to perform the following functions upon detecting an event trigger:

Accumulate a light-curve of gamma-ray photons for the duration of the event (e.g. from few to tens of seconds) using high time-resolution tagged photon arrival times (already a function common to most gamma-ray detectors);

Receive from a central GLINT dissemination system a "template" of the light curve as seen by a reference detection vehicle with its known position;

Determine through cross-correlation or other suitable algorithm the time offset using the detection vehicle's internal clock and the arrival time as detected by the reference vehicle;

Convert the measured time offset into a range measurement between the detection and reference vehicles with respect to the location of the gamma-ray source;

Using the known positions of the GLINT detection vehicle and reference vehicle, and the measured range differences, use trilateration techniques to compute the location of the gamma-ray source;

To avoid systematic errors due to energy-dependent light curves, all GLINT detectors would cover the same energy band, optimized for sensitivity to common high-energy radiation or nuclear events.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A system for Gamma-Ray source Localization-Induced Navigation and Timing (GLINT), comprising:

a gamma-ray detector sub-system mounted on-board a vehicle of interest, said first gamma-ray detector sub-system detecting gamma-ray photons from at least one non-periodic Gamma-Ray Burst (GRB) and outputting time-tagged gamma-ray photons data; and a data processing sub-system operatively coupled to said gamma-ray detector sub-system and configured to process said time-tagged gamma-ray photons data output therefrom, said data processing sub-system including:

(a) a burst profile forming unit operatively coupled to said gamma-ray detector sub-system and configured to accumulate said time-tagged gamma-ray photon data for a duration of said at least one GRB and to form a first light curve burst profile for said at least one GRB;

(b) a burst comparison unit operatively coupled to said burst profile forming unit to receive therefrom said first light curve burst profile and a second light curve burst profile of said at least one GRB as detected at a reference station remotely disposed from said vehicle, wherein said burst comparison unit is configured to execute a burst profile comparison routine adaptively selected for time-aligning said first and second light curve burst profiles of said at least one GRB based upon morphological curve characteristics thereof, said burst comparison unit computing a time difference of arrival (TDOA) of said at least one GRB at said vehicle of interest and at said reference station; and (c) a position estimate unit operatively coupled to said burst comparison unit and configured to compute an estimate of a range of said vehicle of interest relative to said reference station along a line-of-sight to said at least one GRB based on said TDOA.

2. The GLINT system of claim 1, wherein said data processing sub-system further includes a navigation solution unit operatively coupled to said position estimate unit and configured for forming navigation solutions, including position and velocity, for said vehicle of interest.

3. The GLINT system of claim 2, wherein said data processing sub-system is mounted on-board said vehicle of interest for autonomous navigation.

4. The GLINT system of claim 2, wherein said data processing sub-system resides at a central control station and bi-directionally communicates with said vehicle of interest for data transmission therebetween.

5. The GLINT system of claim 4, wherein said central control station is operatively coupled to said reference station to acquire therefrom gamma-ray photons data detected thereat, to form said second light curve burst profile of said at least one GRB detected at said reference station, and to calculate a position of said reference station during said at least one GRB.

6. The GLINT system of claim 4, wherein said central control station is an Earth ground station.

7. The GLINT system of claim 2,
wherein said vehicle of interest is further equipped with a vehicle control unit operatively coupled to said navigation solution unit,
wherein said navigation solution unit includes a navigation solution update unit including an Extended Kalman Filter configured for calculation of navigation solution error, said navigation solution update unit continuously updating said navigation solutions and submitting the updated navigation solution to said vehicle control unit.

8. The GLINT System of claim 1,
wherein said burst comparison unit is configured to perform at least one of a plurality of burst profile comparison routines selected for comparison of said first and second light curve burst profiles based on said burst profiles characteristics,
said plurality of burst profile comparison routines including:
Maximum Burst Peak Alignment routine,
MATLAB xcorr function routine, and
FFTFIT routine.

9. The GLINT system of claim 1,
wherein said position estimate unit is configured to compute a position offset $\Delta r$ between said vehicle of interest and said reference station along the line-of-sight $\hat{n}$ to said at least one GRB using the equation $\hat{n}^T \Delta r = c \Delta t$, wherein c is the light speed, $\Delta t$ is the time offset of said at least one GRB arrival time at said vehicle of interest and said reference station, said $\Delta t$ corresponding to said TDOA computed at said burst comparison unit,
wherein said line-of-sight $\hat{n}$ to said at least one GRB is computed at a central control station,
wherein $\Delta r = r_{sc} - r_{base}$,
wherein $r_{sc}$ is a three-dimensional position of the vehicle of interest $r_{sc} = \{r_x, r_y, r_z\}^T$ relative to the origin of an inertial reference frame, the three-dimensional position $r_{base}$ of the reference station is relative to the origin of an inertial reference frame, $\Delta r$ is the relative position of the vehicle of interest with respect to the reference station, and T denotes the vector transpose.

10. The GLINT system of claim 1, wherein said gamma-ray detector sub-system includes a scintillator unit, a photon timing board, and high-precision clock operatively interconnected each with the other to produce data including time-tagged photons and photon energies responsive to detection of said at least one GRB.

11. The GLINT system of claim 10, wherein said gamma-ray detector sub-system further includes an X-ray detector.

12. A method for Gamma-Ray Source Localization-Induced Navigation and Timing (GLINT), comprising:
(a) mounting a gamma-ray detector sub-system on-board a vehicle of interest,
(b) detecting, at said gamma-ray detector sub-system, gamma-ray photons from a distant celestial at least one non-periodic Gamma-Ray Burst (GRB),
(c) time-tagging said detected gamma-ray photons,
(d) accumulating time-tagged gamma-ray photons data for a duration of said at least one GRB, said time-tagged gamma-ray photons data including intensity of the photons flux,
(e) forming a first light curve burst profile for said at least one GRB,
(f) executing a burst profile comparison routine for time-aligning said first light curve burst profile of said at least one GRB detected at said vehicle of interest with a second light curve burst profile of said at least one GRB detected at a reference station remote from said vehicle of interest, said burst profile comparison routine being adaptively selected based upon morphological curve characteristics of said first and second light curve burst profiles,
(g) calculating a time difference of arrival (TDOA) of said at least one GRB at said vehicle of interest and said reference station based on said comparison of said first and second light curve burst profiles of said at least one GRB,
(h) computing a line-of-sight to said at least one GRB, and
(i) computing a range of said vehicle of interest position relative to said reference station along said line-of-sight to said at least one GRB.

13. The GLINT method of claim 12, further comprising:
(j) computing a navigation solution including positional parameters and velocity for said vehicle of interest upon computing the line-of-sight to said at least one GRB.

14. The GLINT method of claim 13, further comprising:
performing processes (a)-(g) and (i)-(j) at said vehicle of interest in an autonomous navigation mode of operation.

15. The GLINT method of claim 13, further comprising:
performing processes (e)-(j) at a central control station.

16. The GLINT method of claim 15, further comprising:
prior to process (f), transmitting said first and second light curve burst profiles to said central control station for subsequent processing thereat, and
upon completion of process (h), disseminating the position of said at least one GRB to participating vehicles.

17. The GLINT method of claim 13, further comprising:
in process (j), further computing a navigation solution error by applying an Extended Kalman Filter routine to said navigation solution, and
updating said navigation solution accordingly.

18. The GLINT method of claim 13, further comprising:
computing a position offset $\Delta r$ between said vehicle of interest and said reference station along the line-of-sight $\hat{n}$ to said at least one GRB using the equation $$\hat{n}^T \Delta r = c\Delta t,$$

where $\Delta t$ is the time offset of said at least one GRB arrival time at said vehicle of interest and said reference station, said $\Delta t$ corresponding to said TDOA, wherein c is the light speed, and $\Delta r = r_{sc} - r_{base}$, wherein $r_{sc}$ is a three-dimensional position of the vehicle of interest $r_{sc} = \{r_x, r_y, r_z\}^T$ relative to the origin of an inertial reference frame, the three-dimensional position $r_{base}$ of the reference station is relative to the origin of an inertial reference frame, $\Delta r$ is the relative position of the vehicle of interest with respect to the reference station, and T denotes the vector transpose.

19. The GLINT method of claim 12, prior to process (f), selecting a burst profile comparison routine from a plurality thereof based on characteristics of said first and second light curve burst profiles for computing said TDOA, wherein said burst profile comparison routine is selected from a group including a Maximum Burst Peak Alignment Routine, a MATLAB xcorr function routine, and FFTFIT routine.

20. A method for Gamma-Ray Source Localization-Induced Navigation and Timing (GLINT), comprising:

(a) mounting a gamma-ray detector sub-system on-board a vehicle of interest, (b) detecting, at said gamma-ray detector sub-system, gamma-ray photons from a distant celestial at least one Gamma-Ray Burst (GRB), (c) time-tagging said detected gamma-ray photons, (d) accumulating time-tagged gamma-ray photons data for a duration of said at least one GRB, said time-tagged gamma-ray photons data including intensity of the photons flux, (e) forming a first light curve burst profile for said at least one GRB, (f) selecting a burst profile comparison routine from a plurality thereof based on characteristics of said first and second light curve burst profiles for computing said TDOA, comparing said first light curve burst profile of said at least one GRB detected at said vehicle of interest with a second light curve burst profile of said at least one GRB detected at a reference station remote from said vehicle of interest, (g) calculating a time difference of arrival (TDOA) of said at least one GRB at said vehicle of interest and said reference station based on said comparison of said first and second light curve burst profiles of said at least one GRB, (h) computing a line-of-sight to said at least one GRB, and (i) computing a range of said vehicle of interest position relative to said reference station along said line-of-sight to said at least one GRB;

wherein said burst profile comparison routine is selected from a group including a Maximum Burst Peak Alignment Routine, a MATLAB xcorr function routine, and FFTFIT routine;

wherein said maximum Burst Peak Alignment routine is selected for said first and second light curve burst profiles if said at least one GRB is a fast-rise burst, wherein said Maximum Burst Peak Alignment routine includes:

overlaying said first and second light curve burst profiles, finding on said first and second light curve burst profiles respective maximum intensity signals, indicating a first peak at said first light curve burst profile and a second peak at said second light curve burst profile corresponding to said first peak, determining arrival times $t_1$ and $t_2$ of said first peak and said second peak at said vehicle of interest and said reference station, respectively, and calculating said TDOA at a difference between said $t_1$ and $t_2$;

wherein said MATLAB xcorr function routine includes:

creating a cross-correlation plot for said first and second light curve burst profiles, determining a peak signal at said cross-correlation plot, computing a value of lag at said peak signal to determine a delta-index value corresponding to a bin offset between said first and second light curve burst profiles, and subtracting said delta-index value from a peak found at said first light curve burst profile, thereby determining said TDOA; and wherein said FFTFIT routine includes:

estimating fractions of a bin offset between said first and second light curve burst profiles, thereby attaining a refined TDOA.

* * * * *